United States Patent
Pham

[11] Patent Number: 6,129,306
[45] Date of Patent: *Oct. 10, 2000

[54] EASILY-CONVERTIBLE HIGH-PERFORMANCE ROADABLE AIRCRAFT

[76] Inventor: Roger N. C. Pham, 2909 Socrates, Grand Prairie, Tex. 75052

[*] Notice: This patent issued on a continued prosecution application filed under 37 CFR 1.53(d), and is subject to the twenty year patent term provisions of 35 U.S.C. 154(a)(2).

[21] Appl. No.: 09/041,915

[22] Filed: Mar. 13, 1998

Related U.S. Application Data

[63] Continuation-in-part of application No. 08/811,503, Mar. 5, 1997, Pat. No. 5,984,228, and a continuation-in-part of application No. 08/859,732, May 21, 1997, Pat. No. 5,836,541.
[60] Provisional application No. 60/045,106, Apr. 25, 1997.

[51] Int. Cl.$^7$ .................................................. B64C 37/00
[52] U.S. Cl. .................................. 244/2; 244/50; 244/220
[58] Field of Search ................................ 244/2, 120, 49, 244/46, 50, 102 R, 100 R, 104 R, 104 FP, 220, 221, 225, 229

[56] References Cited

U.S. PATENT DOCUMENTS

| | | |
|---|---|---|
| 2,241,577 | 5/1941 | Beals, Jr. ................................. 244/49 |
| 2,692,095 | 10/1954 | Carpenter ................................. 244/49 |
| 3,112,088 | 11/1963 | Speechley .................................. 244/2 |
| 3,116,896 | 1/1964 | Sigler et al. ............................... 244/2 |
| 3,371,886 | 3/1968 | Schertz ..................................... 244/2 |
| 4,269,374 | 5/1981 | Miller ...................................... 244/2 |
| 4,627,585 | 12/1986 | Einstein .................................... 244/2 |
| 4,706,907 | 11/1987 | Kopylov .................................... 244/49 |
| 4,986,493 | 1/1991 | Sarh ........................................ 244/2 |

*Primary Examiner*—Galen L. Barefoot

[57] ABSTRACT

A fixed-wing four-to-six-seat light aircraft that can be easily converted to a roadway vehicle within minutes by a single person in the field, comprising a one-piece wing center panel with foldable wing tips on each sides. The whole wing unit is then rotatably mounted on top of the fuselage. The aircraft features a conventional front-engine-and-propeller lay-out, with a foldable tail section for convenient roadability and garageability. All the wheels are retractable in flight, and it has a long-span, high aspect-ratio wing for exceptional climb and cruise efficiency. The vehicle has a low ride-height with a low center of gravity, four wheels with independent suspension, nose-height leveling for take-off and landing, and anti-sway mechanism for good ground handling ability. Ground propulsion is by automotive-style transmission driving the rear wheels or by hydraulic motors in the all-wheel retractable version.

19 Claims, 14 Drawing Sheets

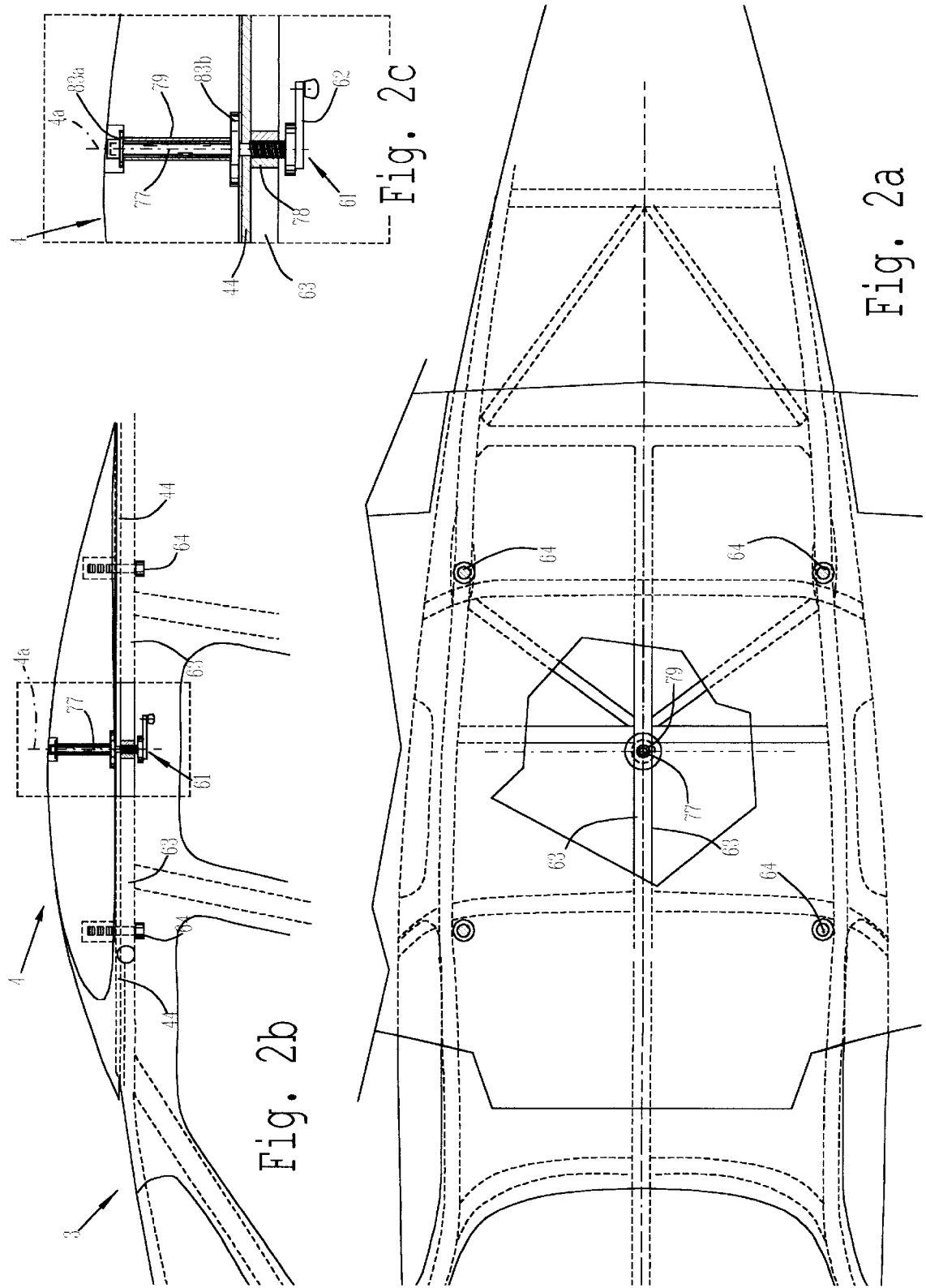

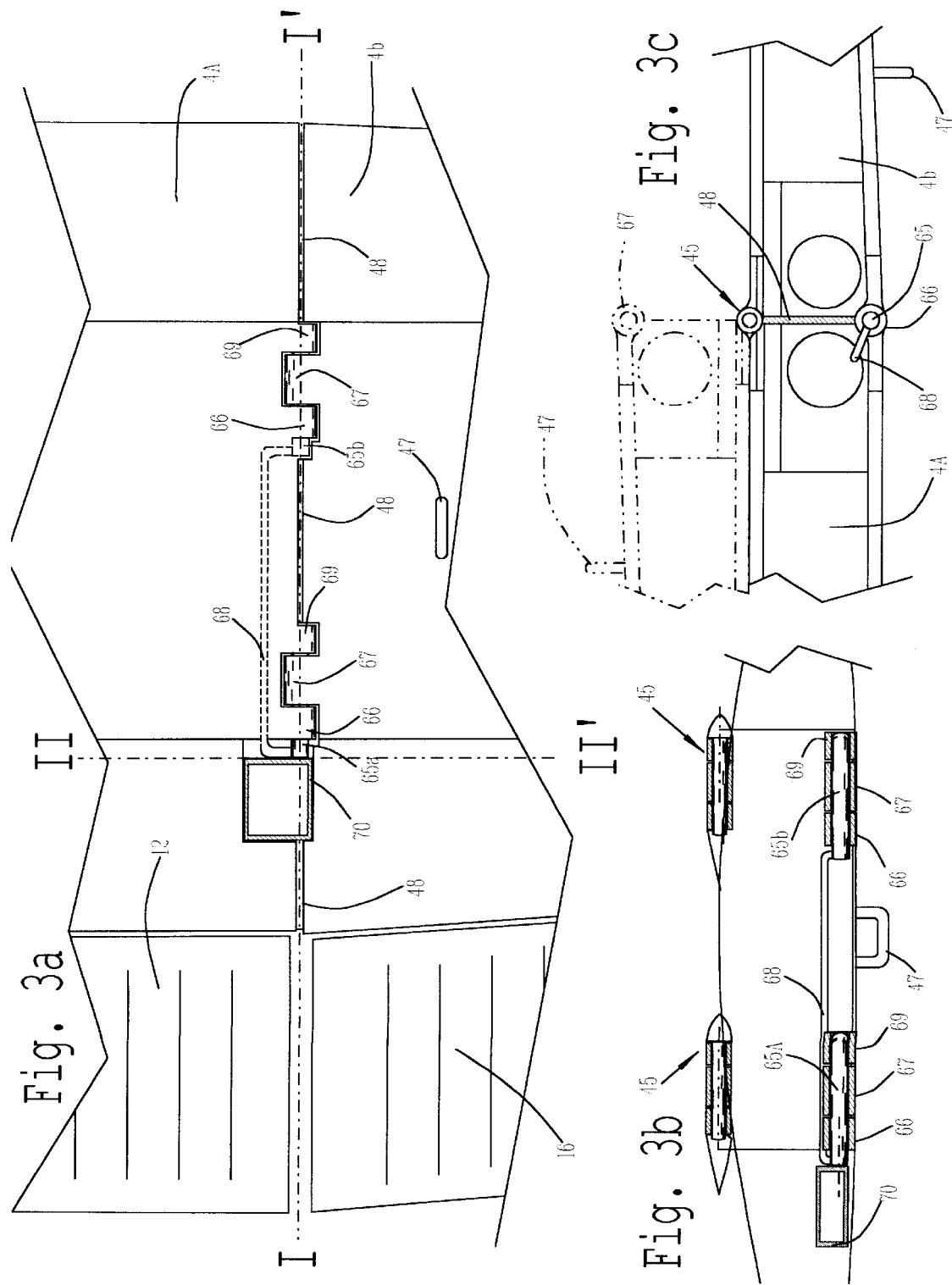

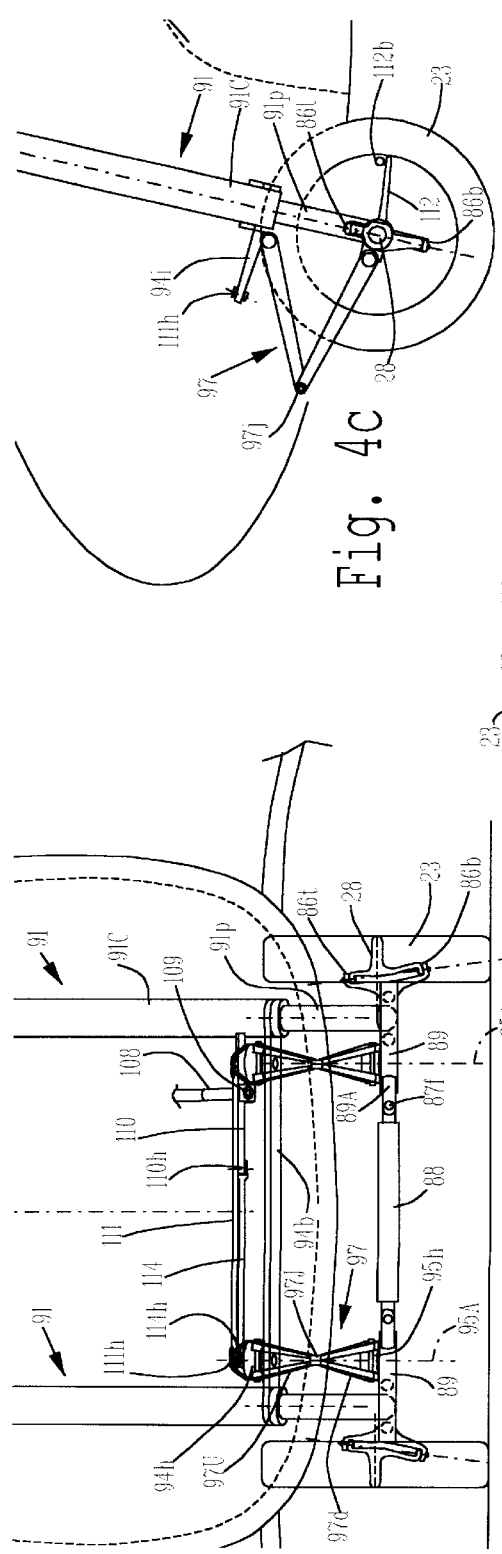

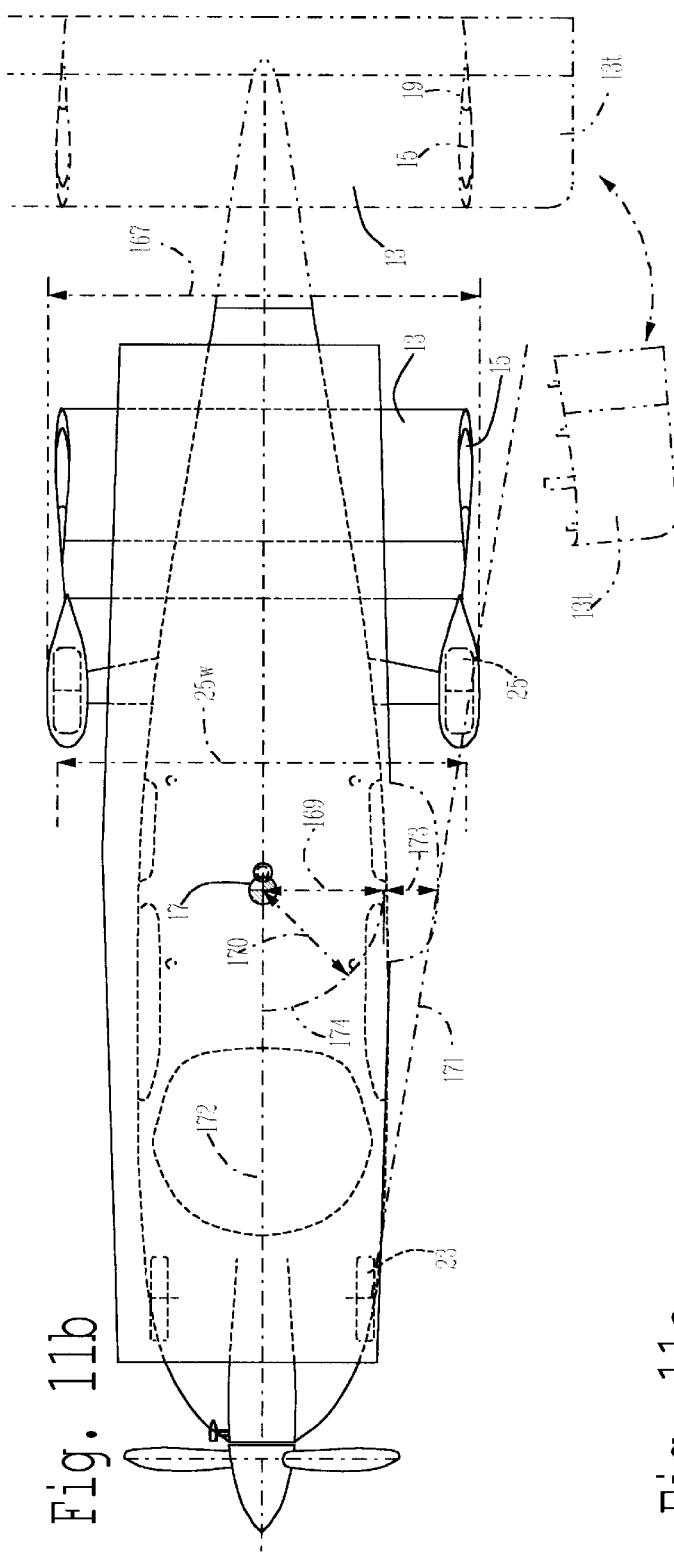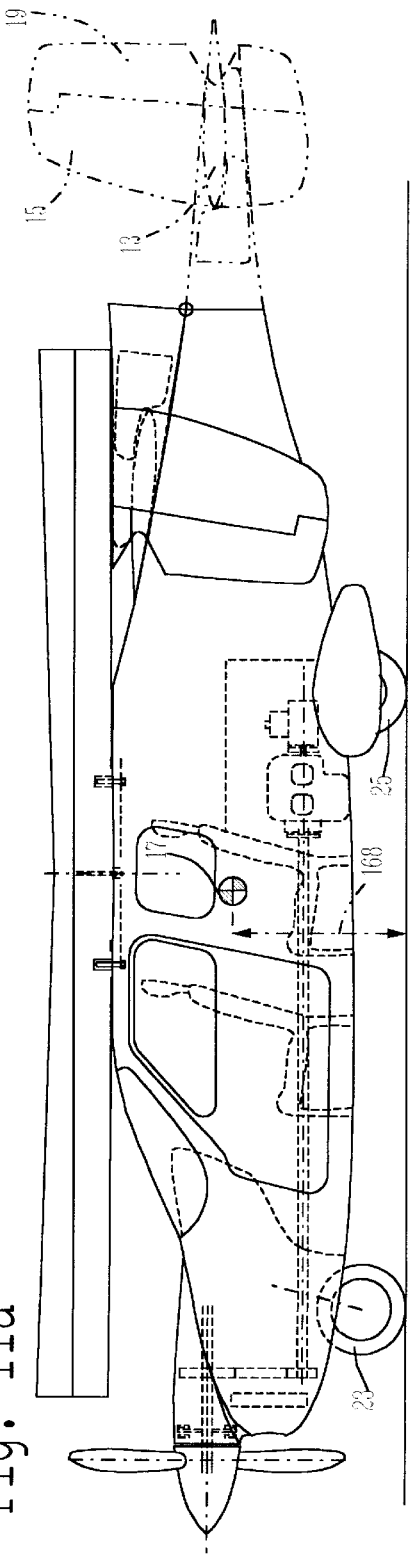

EASILY-CONVERTIBLE HIGH-PERFORMANCE ROADABLE AIRCRAFT

CROSS-REFERENCE TO RELATED APPLICATION

This application is a continuation-in-part of application Ser. No. 08/811,503, filed on Mar. 5, 1997 entitled, "Rapidly-Convertible Roadable Aircraft," now U.S. Pat. No. 5,984,228 and of Ser. No. 08/859,732, filed on May 21, 1997 entitled "Easily-Convertible Fixed-Wing Roadable Aircraft" now U.S. Pat. No. 5,836,541. This application claims benefit of Provisional appl. Ser. No. 60/045,106 filed Apr. 25, 1997.

BACKGROUND OF THE INVENTION

1. Field of the Invention

In general, this invention pertains to convertible fixed wing aircraft of the type that can be flown as a conventional fixed wing aircraft, and can be easily converted to an automotive street vehicle in order to arrive at one's final destination quickly and conveniently without having to transfer to a ground vehicle at the airport.

More particularly, the means to arrive at easy conversion from aircraft mode to automobile mode involves, quite simply, folding of the wing's outboard tips portion overlapping the center wing section, and rotation of the wing from a transverse orientation with respect to the fuselage or body to a longitudinal orientation whereby the vehicle's width is less than the maximum legal width of eight and a half feet (2.59 m), without requiring any dissembly of any parts including wing, tail or fuselage that may be potentially inconvenient and time-consuming. The tail section of this aircraft is foldable upward 180 degrees to overlap the top of the fuselage rear section thereby reducing the fuselage's length allowing it to fit in a typical automobile parking lot or garage.

2. Discussion of the Prior Art

The idea of a single vehicle that can function as an aircraft to cover long distances in the shortest time, and then as a highway vehicle that can be driven from the airport to the ultimate destination, is an attractive one. However, there are many problems that make this ideal concept difficult to realize, and while many have attempted to design such a vehicle, there has never been a successful product that has reached the market.

The problem has been in integrating the functions and structural requirements of the two vastly different vehicles into a single, user-friendly construction that requires a minimum of human intervention in switching from the automotive to the aircraft configuration. The technological bases for both individual systems are highly developed, and it is necessary that this high level of technology for both systems be incorporated in a single system while maintaining the performance of these different systems.

The structural design requirements for an aircraft are quite different from those of an automobile, particularly in the matter of weight and aerodynamic resistance, which must be held to the minimum level, whereas in an automobile, weight and aerodynamic streamliness are not nearly as important consideration. The aerodynamic drag of an auto-mobile body is many times that of an airplane fuselage, due in part to the unstreamlined underbody, with all of the exposed power transmission and suspension gear. Instead, in the automobile, ground handling and comfort especially smoothness and quietness are much more highly stressed, whereas in the light aircraft, ground handling is particularly poor especially in windy condition, and that the cockpit noise and vibration level in these aircrafts are quite objectionable to the non-enthusiasts.

The overall length of the automobile is made as short as possible in order to facilitate parking and maneuverability, whereas the aircraft's fuselage is much longer in order to provide adequate pitch damping and control authority necessary to be certified for production under FAA regulation part 23.

For an air-ground convertible vehicle that is reasonably operable in both modes, a great deal of compromise must be made among above factors, such that the final product, up to now, has been inefficient and has inferior flying characteristic in comparison to a production aircraft, at the same time requiring considerable amount of assembly or dissembly of wings, fuselage and tail section during the conversion.

The case in point is the well publicized effort of a major aircraft company Consolidated Vultee in 1947 in which an automobile body is attached underneath a wing-engine-tail assembly for flying and to be completely detached from this assembly for ground travel mode. Due to the aerodynamically inefficient automobile body as well as excessive weight because the automobile portion contains its own engine and transmission for ground travel, the final Convair Model 118 ConvAirCar of 1947 flew poorly with cruise speed of only 125 mph (200 km/h). After a non-fatal crash in November 1947, the program was cancelled.

After the obvious inconvenience of the ConvAirCar in which the wing and tail must be left behind at the airport in its roadable mode, another highly publicized project, that of Mr. Molt Taylor's Aerocar I, improved on the ConvAirCar due to its ability to trailer its own wings, tails and the tail half of the fuselage. The Aerocar is only one of two roadable aircraft designs ever certified by the FAA for limited production status. Mass production of the Aerocar was almost begun by Ling-Temco-Vought company of Dallas, Tex., but was cancelled due to insufficient pre-production orders. Considerable efforts of at least two persons is required in order to assemble the wings, fuselage and tail prior to flight, and that this conversion can only be carried out in calm to light wind only. One of the owner of one of four Aerocar I prototype ever produced, Mr. Ed Sweeney stated that he is not keen on trailering the wings and tails, that he does not want to do it very often and that he has spent sometimes 45 minutes in converting the Aerocar from its street-legal mode to its flight-ready configuration.

A third well-publicized attempt at overcoming the deficiencies of prior aircar projects is the very recent project of Ken Wernicke of Sky Technology in Hurst, Tex. Wernicke's design sidesteps car-to-plane and plane-to-car transformations by using low aspect-ratio wings that are wider than they are long. Elaborate winglets on the end of the broad wings boost aerodynamic efficiency and make the Aircar about as wide and as long as a bus, at 8.5 ft (2.6 m) in width and 22 ft (6.7 m) in length for the 2-seater version. Even then, Wernicke's own wind tunnel data, which is disclosed in U.S. Pat. No. 5,435,502, reveal that his design's maximum lift to drag ratio (L/D) (index of aerodynamic efficiency) is only 7.5 at lift coefficient of only 0.3, which is only a little more than ½ of the L/D of conventional private aircraft. The L/D got much worse, however, at higher lift coefficient that is required at take-off and landing speed. (A lift coefficient of as much as 1.4 to 2.6 is required for take-off and landing at a typical municipal airport). At the lift co-efficient above 1.0, the L/D of the Aircar gets less than 2, whereas in a conventional aircraft at this lift co-efficient the L/D remains above 10. This means that Wernicke's Aircar will require much more power at the slow flight speed at take-off and landing, will not be able to achieve a reasonable service ceiling (maximum cruise altitude) due to its tremendously high induced drag at higher wings lift coefficient, and that when the engine quits it will literally fall like a brick when turning or slowed down prior to landing. This certainly does not inspire pilot's confident in a single engine aircraft's ability to survive a power-off (or dead-stick) landing. There are other questions regarding Wernicke's design with respect to pitch and roll stability in an aircraft without a horizontal stabilizer and with such a short wing span, and questions regarding its ground handling in a tricycle configuration with such a high center of gravity off the ground and such tall winglets far aft of the center of gravity.

Among those less well publicized roadable aircraft designs, including at least 76 patented designs granted between 1918 and 1993, none has been able to simultaneously solve the large number of problems inherent in a typical roadable aircraft design such as excessive weight, aerodynamic inefficiency and poor stability in comparison to a typical light airplane, time and labor-consuming conversion between ground and air modes, poor ground handling in comparison to a typical automobile, and excessive complexity that translates into increase in production and maintenance cost as well as lack of reliability.

The prior art also includes various patents of sub-class 244/46 disclosing fixed wing aircrafts with mechanism for wing rotation 90 degrees with respect to the fuselage. To my knowledge, none of those are roadable aircrafts. They are supersonic fighters such as in U.S. Pat. Nos. 4,998,689 of Woodcock, 3,971,535 of Jones and 3,155,344 of Vogt. All these designs involve wing rotation while flying therefore utilizes heavy and complex turet mechanisms capable of withstanding the full stresses in flight that are not adaptable to the lighter roadable aircraft that does not need to rotate its wing while flying. Other wing rotation mechanisms in the prior art are designed for much larger commercial or military transport aircrafts that must rotate their wing only for compact storage purpose. Their mechanisms are also too complex and too expensive for use in a light personal aircraft. For examples, Rumberger et al. of U.S. Pat. No. 5,337,974 discloses a wing rotation mechanism for storage of the V-22 tilt-rotor aircraft involving a large diameter unitary ring structure as the wing bearing. This large ring structure must be precisely shaped, which involved high cost and inherently give rise to lots of friction during wing rotation, therefore wing rotation powered by the muscle strength of a single operator is difficult, not that this necessary or even desirable in its role for the very large and expensive tilt-rotor aircraft. Furthermore, Rumberger's design does not provide for a mechanism of wing to fuselage sealing, thus requiring very high production tolerance of the rotating surfaces involved thus further increases cost, but in a government contracted defense-related project, cost concern is perhaps not a high priority. Nor does Rumberger's design provide for vibration damping between the wing and the fuselage, perhaps causing more fatigue and wear on the metal parts involved.

Furthermore, to my knowledge, there has been no disclosure involving aircraft of any kinds that involves together the folding wing tips and wing rotation mechanisms as will be disclosed in this invention. Yet, this combination is crucial for a roadable aircraft with wing span sufficiently large for practical useful loads capacity and economical flying, and allowing such an roadable aircraft to have the conventional front-mounted propeller that has been proven in nearly 100 years of aviation history to be the most practical configuration.

And yet furthermore, to my knowledge, there has been no disclosure involving aircraft of any kinds that involves the upward folding mechanism of the tail section on top of the rear fuselage section as means of reducing the fuselage's length. Yet, this method allows for far faster conversion between the roadable mode and the flight mode than the prior art's method of complete detachment of the rear fuselage section as in Molt Taylor's Aerocar as mentioned, without the inconvenience of trailering behind the fuselage's rear section.

SUMMARY AND OBJECTIVES OF THE INVENTION

It is a main objective of this invention to disclose a new and improved air-ground vehicle design that can be easily converted from aircraft to automobile configuration, or vice versa, with a minimum amount of manual structural modification, and having permanently connected control systems that are conventional for both aircraft and automobile use, that is capable of matching or exceeding the performance of a typical modern high-performance light aircraft and also capable of traveling in public roads with ground-handling, comfort and stability as good as a typical modern sport-utility vehicle.

It is another objective of this invention to disclose a roadable aircraft that is easy to fly even for inexperienced pilots due to its low center of gravity and generous pitch and roll stability, and very safe and pleasurable to fly to all pilots, with its out-of-cockpit visibility much improved over that of most other propeller-driven light aircraft.

It is another objective of this invention to disclose a roadable aircraft that can carry six adult occupants with full luggages and yet is still compact enough to fit a standard size automobile garage as well as as standard size automobile parking slot.

It is another objective of this invention to disclose a roadable aircraft design that can accept either a piston engine or a much lighter turbine engine utilizing basically the same airframe, with resultant saving in development and production cost.

It is another objective of this invention to disclose mechanisms for rapidly converting an air-ground vehicle between its two modes that are extremely simple, light in weight, reliable and low in cost.

It is another objective of this invention to provide for a cockpit system for controlling such an air-ground vehicle that is familiar to both airplane pilots and car driver so as to minimize any potential for erroneous control input from pilots previously trained in a conventional aircraft.

It is another objective of this invention to disclose a new and improved aircraft that is more resistant to lost of control or over-turning (flipping over) when taxiing on the ground due to cross-wind and wind turbulent and yet has the same capability for short-runway take-off and landing as a typical single engine private aircraft.

Further objects and advantages of this invention will become apparent from a consideration of the drawings and ensuing description.

In summary, in order to achieve all the aforestated objectives, the roadable aircraft of this invention embodies a one-piece wing center section with the wing tips foldably overlapping this center section. Thus folded, this wing unit is then rotated 90 degrees on the top of the fuselage in order to overlap the vehicle fuselage for ground travel. The piston engine is mounted behind the passenger cabin, thereby allowing the aircraft's center of gravity to be further aft than that of an front engined aircraft, allowing the wing to be mounted further aft. This allows the wing's center section to be long enough so that a wing of sufficient size and with an aspect ratio of 9:1 is achievable for good aircraft performance. A conventional aircraft propeller is mounted in the nose of the aircraft driven by a long drive shaft for maximum simplicity and reliability. The aircraft's fuselage is almost as long as that of a typical light aircraft in order to allow it to have the pitch and yaw stability required for the novice pilot. To fit this aircraft in a typical home garage, the aircraft's tail section is foldable upward 180 degrees to overlap the rear section of the fuselage. For maximum ground handling, four wheels are used instead of three wheels in a typical aircraft, completely with independent suspension and shock-absorption system as well anti-sway mechanism. Due to the farther aft center of gravity, the vehicle's wheel base (distance between the front wheels and the rear wheels) is lengthened thus improving the vehicle's stability in cross wind. The longer wheel base also minimizes the forward shift in the center of gravity during rapid braking, thereby enhancing the vehicle's stopping ability. Furthermore, the longer wheel base means that the rear wheels are placed further to the rear, thus reducing the vehicle's overhang behind the rear wheels and improves roadability. The two front wheels are placed within the front fuselase width and are retractable within the front fuselage's space for improved aerodynamic efficiency. The two rear wheels are also retractable into the rear fuselage section for maximum aerodynamic efficiency. For ease of controlling in the road, an automobile style steering wheel is mounted in the usual position. Ground acceleration is done via the gas pedal also in the usual position. Rudder control is via a pair of rudder pedals mounted right next to the gas pedal. Ground braking is done via toe braking action on both rudder pedals as in conventional aircraft. Roll and pitch control is via a joy stick mounted in the area between the two front seats (same location as would a manual transmission gear shift stick be placed) in order to be accessible to both front seat occupants in case of emergency.

BRIEF DESCRIPTION OF THE DRAWINGS

FIGS. 1a through 1h represent plan view, side elevation, front view and rear view of the air-ground convertible vehicle of this invention, with FIG. 1c and 1g being closed up view of locking mechanisms, and FIG. 1h showing the vehicle in its roadable configuration.

FIG. 2a, FIG. 2b and FIG. 2c are top plan view, side elevation and closed-up view, respectively of the wing mounting and rotation mechanism.

FIGS. 3a, 3b, 3c are the top plan view, side cross-section and front-rear cross-section, respectively of the wing tip folding mechanism.

FIG. 4a, FIG. 4b and FIG. 4c are the front view, top plan view, and side view, respectively, of the front wheel suspension, retraction and steering mechanism.

FIGS. 11a and 11b are yet another version of this vehicle, this one has reduced width in its roadable configuration.

DESCRIPTION OF THE PREFERRED EMBODIMENTS

Figure 1A:
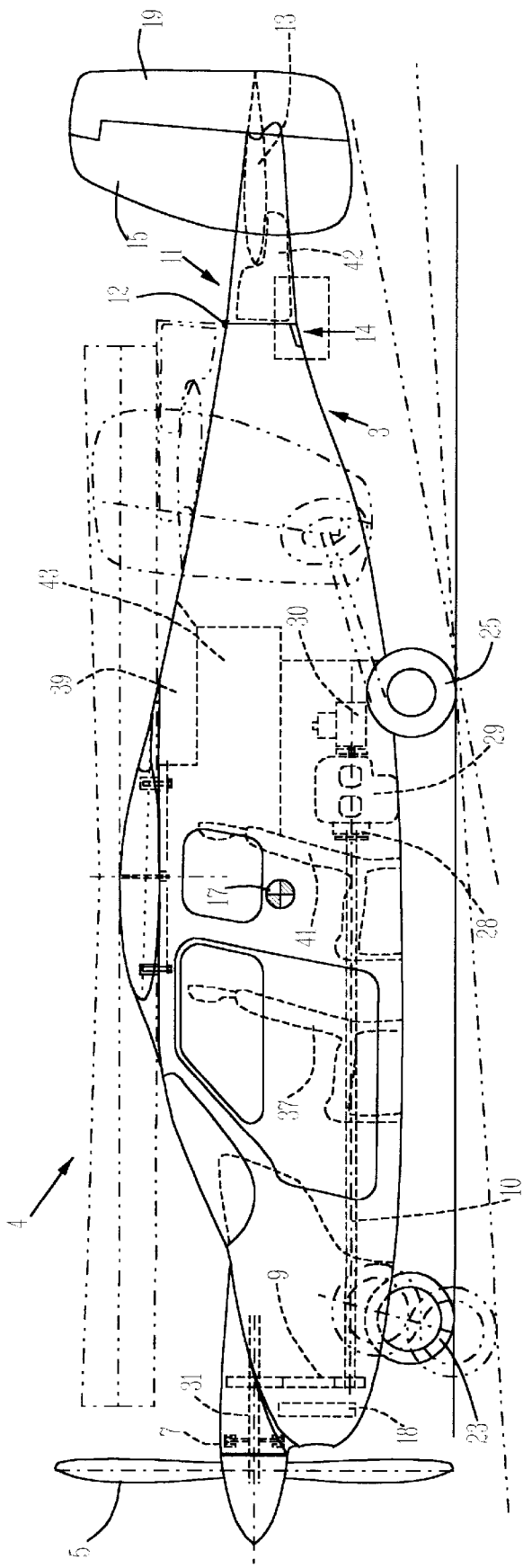

FIG. 1a through FIG. 1d show the general layout of the main embodiment of this invention. The vehicle is designated in its entirety by the reference numeral 1, and comprises a conventional front-propellered general aviation aircraft fuselage 3 which is about 23.5 ft in length (7.16 meters). In its roadable form, referring to FIG. 1h, it is only 19.5 ft long (5.9 m) which allows it to fit in a typical home automobile garage and parking lot. Its maximum height is only 6 ft (1.83 m), well under the 7 foot door height (2.14 m) of a home garage or ceiling of a parking garage. Its maximum width is less than the 8.5 ft (2.6 m) legal limit for a road vehicle, and referring to FIG. 11b, its maximum width may be made as low as 7 ft (1.83 m) and it still has sufficient lateral stability for road use.

Mounted on top of the fuselage is the wing unit 4. The wing unit 4 is rotatable with respect to the fuselage 3 allowing the wing unit 4 to be aligned with the fuselage in the roadable mode. The wing unit 4 is also foldable into it-self on both sides half way between the wing root and wing tips, allowing maximum wing span of about 34 ft (10.3 m). With wing area of 132 square feet (11.4 m$^2$), the wing aspect ratio is almost 9:1 which is higher than that of factory-built general aviation aircrafts. This contribute significantly to its fast climb rate, long range and fuel efficiency. Furthermore, the wing employs new NASA-developed natural laminar flow airfoil type that is custom designed by computer according to the aircraft projected performance parameter. These types of airfoils provide higher lift coefficient allowing smaller wing area thus reduction in skin friction drag, and due to laminar flow over greater than 30% of wing area, even further drags reduction is possible. Details of mechanism of wing rotation and wing folding will be discussed subsequently.

Propulsion in the air mode is via a conventional 78-inch diameter (1.98 m) propeller unit 5 with variable pitch. For maximum gliding efficiency in the event of engine failure, the propeller should be featherable. Propeller 5 is attached to prop shaft 31 which is attached to the propeller-speed-reduction unit (PSRU) 9. In front of the PSRU 9 is the propeller brake unit 7 designed to lock the propeller in-place as shown in FIG. 1a in order to provide ground clearance for the roadable mode. Motive power for both air and road modes is supplied by piston engine unit 29 mounted behind the cabin, and connected to the PSRU unit 9 via a long drive shaft 10. The engine 29 is preferably a very compact and light weight engine of automotive origin, liquid cooled with 2.5–3.0 liters displacement, with horsepower rating from 180–250 hp (133–185 Kw). Interrupting the engine's power connection to the drive shaft 10 is the propeller clutch unit 28. Mounted behind and also powered by the engine 29 is a hydraulic pump 30 supplying hydraulic pressure to a pair of hydraulic motors 35 adjacent to the rear wheels 25 for driving in the roads. More details about hydraulic system will be later discussed. The radiator 18 is mounted right behind the propeller 5 and below the propeller shaft 31 and in front of the aircraft's cabin in order to provide a convenient source of heat for windshield defrosting and cabin heating.

Another feature very important for roadability is the quadricycle (4-wheeled) landing gear configuration instead of the tricycle configuration in conventional aircraft. Quadricycle configuration provides for better lateral stability against rolling over for a given wheel track width (distance between the right wheel and the left wheel). Quadricycle configuration also permits placement of the center of gravity (CG) 17 further away longitudinally from the wheel axles thus allowing good road handling, much greater stability in cross winds and against tumbling over in strong tail winds or forceful braking. However, unlike the four-wheel arrangement in an automobile wherein the track width of the front wheels is nearly the same as that of the rear wheels, the track width of the front wheels in this vehicle is much more narrower than that of the rear wheels. This is because the front wheels must be able to retract completely within the vehicle's front section during flight in order to reduce aerodynamic drags thereby making high performance possible. Hence, the front wheels' track width must be within the width of the front fuselage. On the other hand, to make up for the narrow track width of the front wheels, the track width of the rear wheel must be much larger, substantiall outside of the width of the fuselage, for adequate lateral stability. In FIG. 1*a*, the CG 17 is 3.25 ft (1 m) in front of the rear wheels 25, which is much greater than respective distance in a tricycle wheeled aircraft. This, plus a much lower CG location of 2.8 ft (0.85 m) above ground, minimize adverse weight distribution on the wheels during braking or turning, greatly enhance the aircraft's ground handling characteristic. This is highly desirable with respect to cross-wind resistance, narrow runway or to rough-field operation, and improvement in braking after landing hence shortening of landing distance. The front wheels 23 are equipped with nose-height-leveling mechanism in order to raise the nose up to provide for propeller ground clearance before a flight. The rear wheels 25 are mounted on spring steel landing gear legs 27 and are retractable into the fuselage 3 via mechanism similar to the main landing gear retractable unit from high-winged retractable Cessna aircrafts.

Referring to FIG. 1*a*, it can be seen that there is enough cabin space for at least four adult occupants in the front seats 37 and rear seats 41. Right behind the rear seats 41 and on top of the engine 29 is rear luggage space 43. Above luggage space 43 is a compartment 39 reserved for a rocket-deployable parachute safety recovery system for safely lowering the aircraft to the ground in the event of in-flight structural failures, fire, or lost of control. When loaded with only occupants in the front seats, the vehicle should be somewhat nose-heavy. The vehicle is designed to be optimally balanced only when it is fully loaded, with passengers in the rear seats and luggages aft of the rear seats 41. However, it is known that a nose-heavy but lightly loaded aircraft is perfectly controllable in flight, at the expense of decrease in efficiency. Ballast is therefore desirable in the tail section of the aircraft when it is in the nose-heavy condition. Ballast, however, is still extra weight to the aircraft that must be avoided. Therefore, the optimum solution is to use the aircraft's reserve fuel capacity as ballast for the tail section, contained in the tail section fuel tank 42. Designed to carry about 60 lbs (27 Kg) of fuel, its location gives it three times the moment arm compared to the moments of the rear cabin cargoes, hence it can replace 180 lbs of load in the rear compartments of the vehicle. Since the aircraft normally is not expected to use its reserved fuel, efficiency is not affected. Even in unexpectedly long flight when most of its reserve fuel is consumed, the aircraft is still controllable in the air. Efficiency is only affected toward the end of the flight when the reserved fuel is used up. It is very important however, to remember to pump dry the reserve fuel tank into the wing's fuel tanks when the vehicle is fully loaded in the rear luggage compartment 43 in order to avoid undue tail heaviness. Referring to FIG. 1*a*, it can be seen that in the roadable mode, upward visibility above the nose from the cabin is very poor, due to the wing 4 overlapping with the fuselage, blocking the view. This will prevent the driver from being able to see the overhead traffic lights up close. Furthermore, although over-the-nose downward visibility is at an acceptable angle at level attitude, in the nose-up attitude during takeoff or landing, over-the-nose visibility is poor. To remedy this problem, referring to FIG. 1*b*, a high resolution video camera 8 is mounted right behind the propeller 5 on the right side of the propeller pod 6. This camera is swivelable up and down as needed depending on which air or roadable mode one is in. Image from this video camera is conveyed to the instrument panel's computer display monitor. This monitor, preferably a light-weight flat panel active matrix display of lap-top computer origin, may also be used to display navigational data, terrain map, weather map or other data as required, replacing the typical analog gauges used in the older generation of aircrafts. A special video camera may also be used to enhance night vision should the needs arise.

Figure 1C:
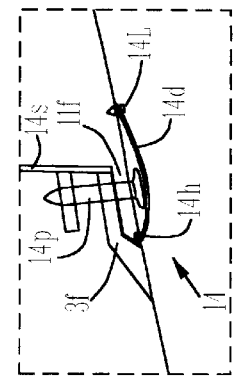
Figure 1B:
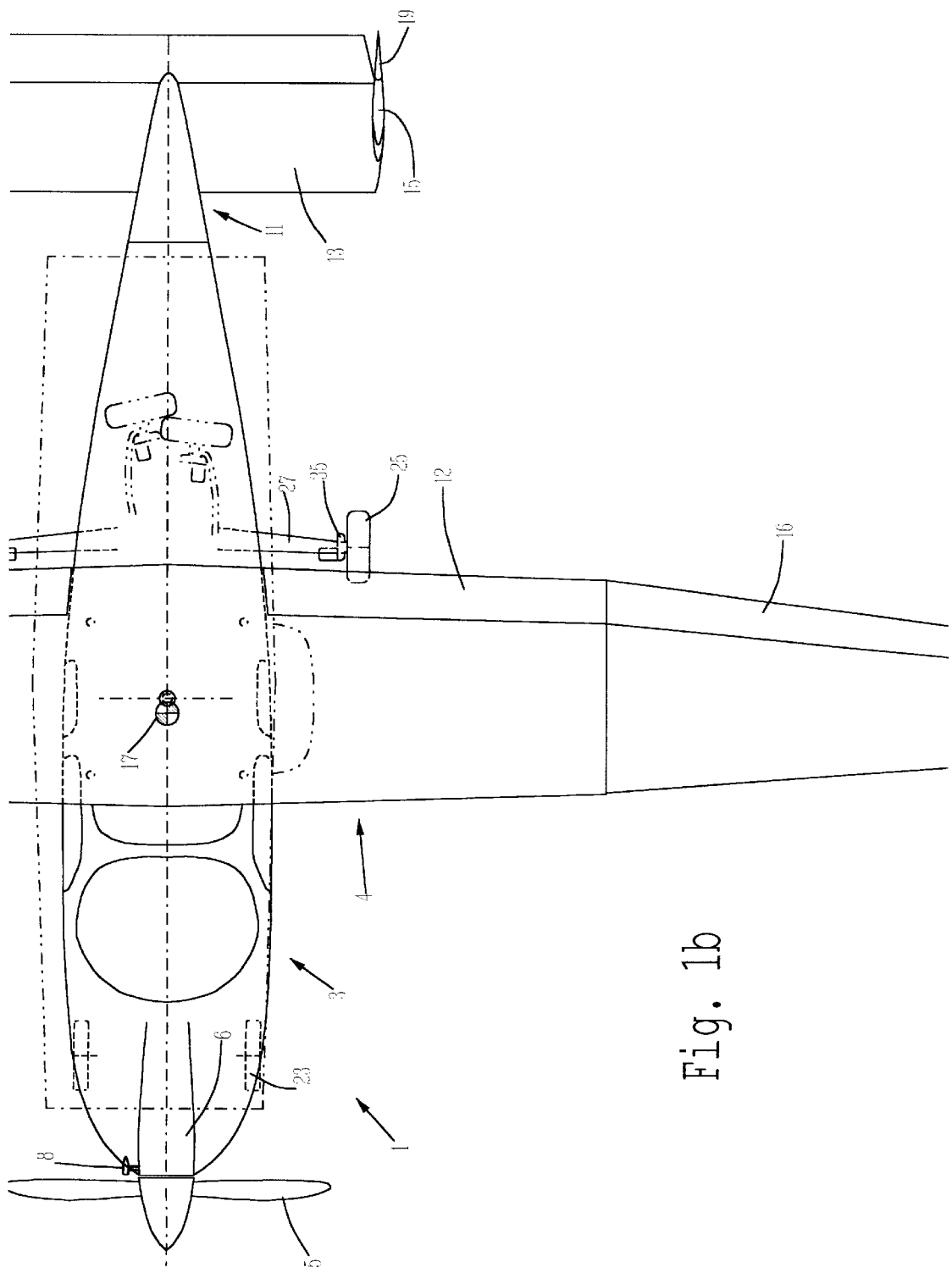

Toward the rear of the vehicle, the tail end of the vehicle is foldable vertically and almost 180 degrees forward, making the vehicle considerably shorter with greatly reduced overhang behind the rear wheels 25 (fuselage section behind the rear wheels). The tail section 11 of the vehicle is attached to the fuselage via hinge joint 12 on its top portion, and tail section 11 is removably attached to the fuselage on its bottom portion by locking pin mechanism 14 as shown enlarged in FIG. 1*c*. Referring to FIG. 1*c*, the fuselage 3 and the tail section 11 both have metal flanges 3*f* and 11*f* emanating from their respective bottom ends. The metal flanges 3*f* and 11*f* have matching holes allowing them to be locked together by locking pin 14*p*. Locking pin 14*p* is restrained from sliding out of its engaged position by door 14*d* hingeably attached to the fuselage on hinge 14*h* and latched closed by latch 14L that can be unlatched with one finger. The junction of the fuselage 3 and tail section 11 is sealed by resilient rubber strip 14*s*. The horizontal tail span is designed with a span slightly less than the 8.5 ft (2.6 m) maximum legal width required for roadability. In the folded position, the tail section may simply be secured by the mere presence of the folded wing on top, referring to FIG. 1*a*.

Figure 1F:
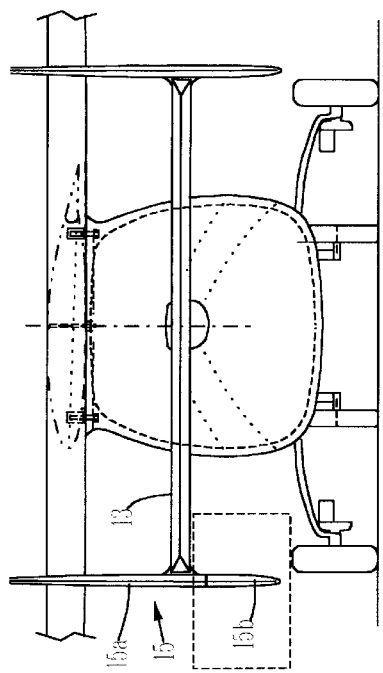
Figure 1G:
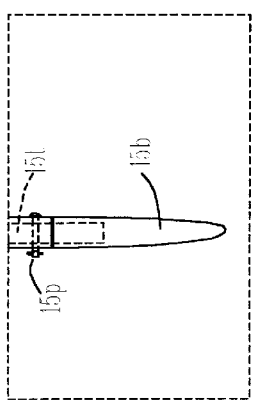
Figure 1D:
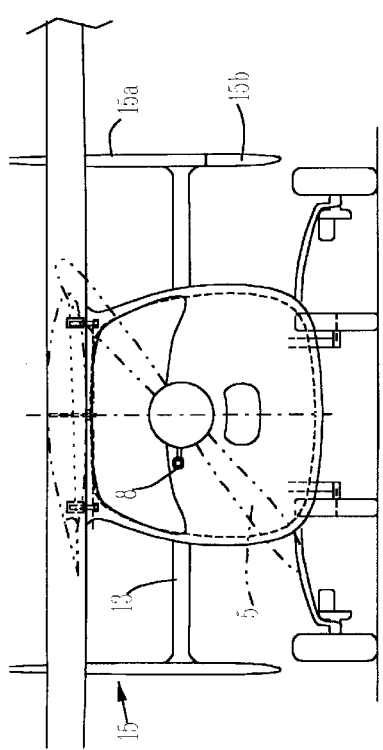

FIG. 1*d* is a frontal view of the air-ground vehicle, wherein the propeller 5 can be seen in its locked-in position for road mode. The propeller's diameter is large enough for it to touch the ground if not being locked in place. Over-the-nose downward visibility is actually not bad, but upward visibility is very poor and should be augmented by video camera 8. It can be seen that the vehicle is quite stably planted on its wheels given the vehicle's low ride height, in comparison to conventional aircraft of similar dimensions. Given adequate 4-wheel independent suspension, shock absorption and anti-sway mechanism as will be subsequently discussed in details, this vehicle's road handling should be comparable to a typical sport-utility (road) vehicle (SUV).

Figure 1H:
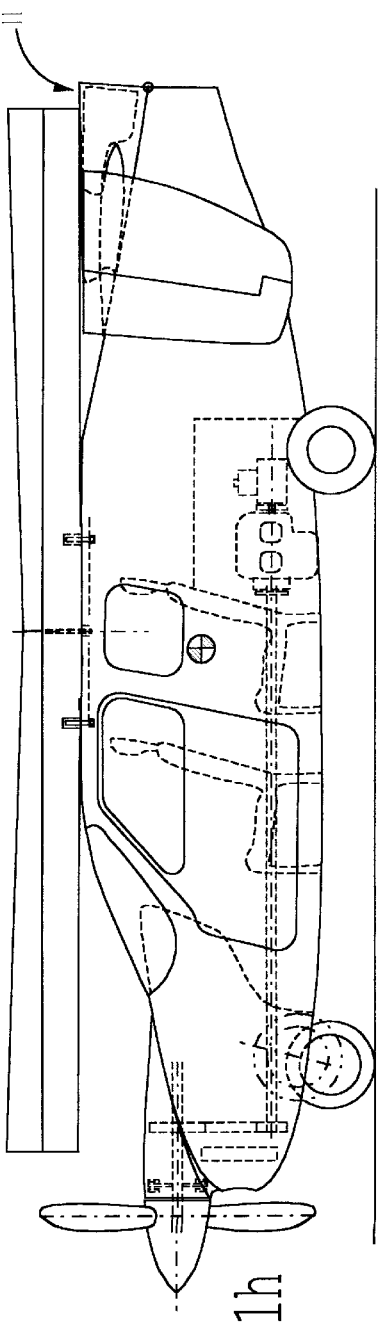

FIG. 1f is the rear view of the vehicle. The vertical stabilizers are represented by a pair of vertical fins 15 disposed at opposite ends of an elongated horizontally oriented structure representing the horizontal stabilizer 13. The vertical fin 15 on the left side of the vehicle is divided into a main portion 15a and a detachable bottom portion 15b. The rationale for this is illustrated in FIG. 1h, wherein it can be seen that after tail section 11 is folded forward, it is necessary to provide clearance for the wing rotation when it overlaps on top of the fuselage in the roadable mode. The removable attachment mechanism for bottom fin portion 15b is illustrated in enlargement view, referring to FIG. 1g. Portion 15b has a protruding tongue 15t that can be fitted tightly into corresponding recess in main vertical fin portion 15a. Then, both portions 15a and 15b are locked together by locking pin 15p that is retained by a typical cotter pin too small to be shown clearly.

FIGS. 2a–c are closed-up details of the simple wing rotation mechanism. The wing 4 is rotatable with respect to the fuselage 3 on a vertical axis 4a on top of the fuselage in the center of the cabin. Referring to FIG. 2c, rotational axis 4a is formed by a channel 79 through the center point of the wing wherein traverses a metal rod 77, around which the wing rotates. Rod 77 is rotatably retained through the wing 4 by lower disc 83b and upper cap 83a. Lower disc 83b also serves as lower bearing for rod 77 and is permanently welded to rod 77 while upper cap 83a is screwed on to the upper tip of rod 77 in order to allow for rapid removal of the wing 4 away from rod 77 and hence away from the fuselage. The junction between the top of the fuselage and the lower wing surface is lined with resilient pads 44 made from neoprene rubber. The resilient pad 44 acts not only as seals but also as vibration damper in order to reduce transmission of vibration from the fuselage to the wing that can cause premature wear to the wing attachment and folding mechanism. The resilient pad 44 is coated with a smooth vinyl or teflon layer on the exposed surface in order to reduce friction during wing rotation. Even so, due to the considerable weight of the wing plus any fuel that may be contained in the wing, considerable resistance to wing rotation will develop that can cause premature wear on the smooth coated surface of the resilient pad 44. Therefore, it is better to unseat the wing from the fuselage resilient pads by a few milimeters just prior to wing rotation by means of a hand-cranked jack 61. Jack 61 is formed by a crank 62 bolted to the threaded lower end of rod 77, which is threadedly journaled through bearing 78 that is attached to the fuselage beam 63, whereby cranking a few turns on crank 61 will cause a slight vertical movement of wing 4 with respect to the fuselage 3.

After completion of 900 rotation, the wing should be tightly seated against the fuselage via cranking action on jack 61. Referring to FIGS. 2a and 2b, the fuselage is then firmly bolted to the wing by four large bolts 64 from inside the fuselage. A torque wrench should be used to tighten the bolts 64 each time with specified amount of torque for safety reason.

FIGS. 3a, 3b and 3c illustrate details of the wing folding mechanism. FIG. 3a illustrate the bottom surface of the wing where locking-pin mechanism is used to lock the outer wing panel 4b against the inner wing panel 4a in the extended mode. Referring to FIG. 3c, which is a vertical section of FIG. 3a along line B—B', the outer wing panel 4b is foldable 180 degrees around hinges 45 in order to overlap on top of inner wing panel 4a in the roadable mode. When thus folded, the wing panels should be strapped together with bungee cord (not shown) or other mechanism in order to prevent unwanted movements. To unfold the wing prior to a flight, the straps are removed. Then, the operator will grab onto the outer wing panel 4b via handle 47 and pull the outer wing panel 4b 180 degrees downward to the wing's extended position. Using one hand to pull down on handle 47 in order to compress against a resilient layer 48 placed between the two wing panels 4a and 4b, the operator will use the other hand to slide the locking pins 65a and 65b through locking cylinders 67 belonging to the outer wing panel 4b and through locking cylinders 69 belonging to the inner wing panel 4a in order to lock the two wing panels together on the bottom surface of the wing, thereby allowing the wing panels to remain rigidly in extension. Referring to FIG. 3b, which is a vertical section of FIG. 3a along line A—A', the front locking pin 65b and the rear locking pin 65a are preferably connected together by a rigid metal rod 68 allowing synchronized movements of both pins. Once the locking pins are in their locking place, their positions are secured by a spacer box 70 that is latched onto the bottom surface of the wing. Spacer box 70 must be removed before the locking pins can be disengaged from their locked positions.

Even with the wing thus rotated and folded, the control of the aileron surfaces 16 (FIG. 3a) via tensioned pull-pull cable mechanism as is the common practice, is still possible. This accomplished by a control cable de-tensioning mechanism (not shown) operated by a lever (not shown) inside the cockpit. Before wing rotation or folding action, the tension on the control cables will be removed, and before a flight, this tension will be restored. This same de-tensioning mechanism also applies to cable control of rudders and elevator surfaces, due to the folding action of the fuselage tail section 11.

FIGS. 4a, 4b and 4c illustrate details of the vehicle's all-combined front-wheel steering, suspension, shock-absorption and nose-height leveling system. Referring to FIG. 4a, it can be seen that this is a unique two-wheeled front suspension system that combines a very high range of vertical travel with a relatively narrow wheel track-width in relation to the degree of vertical travel, while maintaining the same wheel track width and wheel camber throughout the full range of wheel's vertical travel, and independent suspension feature, for optimum road handling. To my knowledge, this type of front wheel suspension does not exist in the prior art, neither automotive nor aeromotive.

The center-piece of this suspension system is a pair of long hydraulic struts 91 disposed symmetrically on each side in the front section of the vehicle. Strut 91 has a cylinder portion 91c and piston portion 91p. On the bottom end of piston portion 91p there is fixedly attached the front wheel steering axis assembly 89. Assembly 89 has hinge joint 86t on top end and hinge joint 86b on bottom end allowing the spindle 28 and hence wheel 23 to be swivelable on axis 90 whiled attached on hinge joints 86t and 86b. Notice that axis 90 is offset some degrees from vertical, referred to in automotive language as "steering axis inclination." This is designed to improve steering self-returning tendency as well as to minimize tire scuffing and steering wheel vibration due to roughness in road surface. In order to keep piston portion 91p from rotating with respect to cylinder portion 91c, front wheel assemblies 89 on both sides are linked together by a telescopic link 88. To maintain completely independent suspension feature on each side, telescopic link 88 has two cylindrical pieces slidingly fitted thereby allowing its length to be variable as the wheel on one side is moved up or down with respect to the other wheel. Telescopic link 88 articulates only in the vertical direction with front wheel assembly 89 via hinge joint 87r and 87f. Referring to FIG. 4b the anterior hinge joint 87f and the posterior hinge joint 87r are sufficiently spaced apart by arms 88a and 89a emanating from respective assembly 88 and assembly 89 in order to strictly forbid any horizontal play between telescopic link assembly 88 and steering axis assembly 89 that can intefere with precision of steering.

Referring to FIG. 4b, the vehicle's steering system is a very simple non-powered but well-proven rack-and-pinion steering system. Rotational movement from steering wheel 107 is transmitted by steering shaft 108 to pinion gear box 109 at the end of shaft 108. Pinion gear box 109 is mated to steering rack 110. Rack 110 is then connected to steering input rod 114 via hinge joint 110h. Steering input rod 114 is connected to steering input arm 94i via hinge joint 114h. Steering input arm 94i is attached to upper hub 94h, as referring to FIG. 4a. Hub 94h is mounted on cross beam 94b bridging suspension struts 91 on both sides together. Hub 94h is rotatable on axis 95a. Also rotatable on axis 95a is lower hub 95h which is mounted directly on top of the right assembly 89. Linking between upper hub 94h and lower hub 95h are a pair of V-arms, with upper V arm 97u and lower V arm 97d articulatedly joined at hinge joint 97j. Upper V-arm 97u articulates vertically with upper hub 94h, and lower V-arm 97d articulates vertically with lower hub 95h, all together, forming wish-bone assembly 97 for transmitting steering force from the steering wheel 107 to the front wheels 25. Referring to FIG. 4b, emanating from lower hub 95h is steering output arm 95o which transmits force to spindle arm 112 via steering output rod 113. Spindle arm 112 emanates from spindle 28 to which the front wheel 23 is mounted to. Ball joints 112b and 113b allow pivotable linkages between output arm 95o, rod 113 and spindle arm 112 as mentioned. Similar wishbone assembly 97 exists on the left side of the vehicle, receiving steering input via tie rod 111. Tie rod 111 links respective input arms 94i on each side of the vehicle, in order to transmit steering input from the right side of the vehicle to the left side. It can therefore be seen that wish-bone assemblies 97 allow for complete steering control of the front wheels at all range of vertical travel, which is a very wide range in this suspension arrangement.

Figure 5:
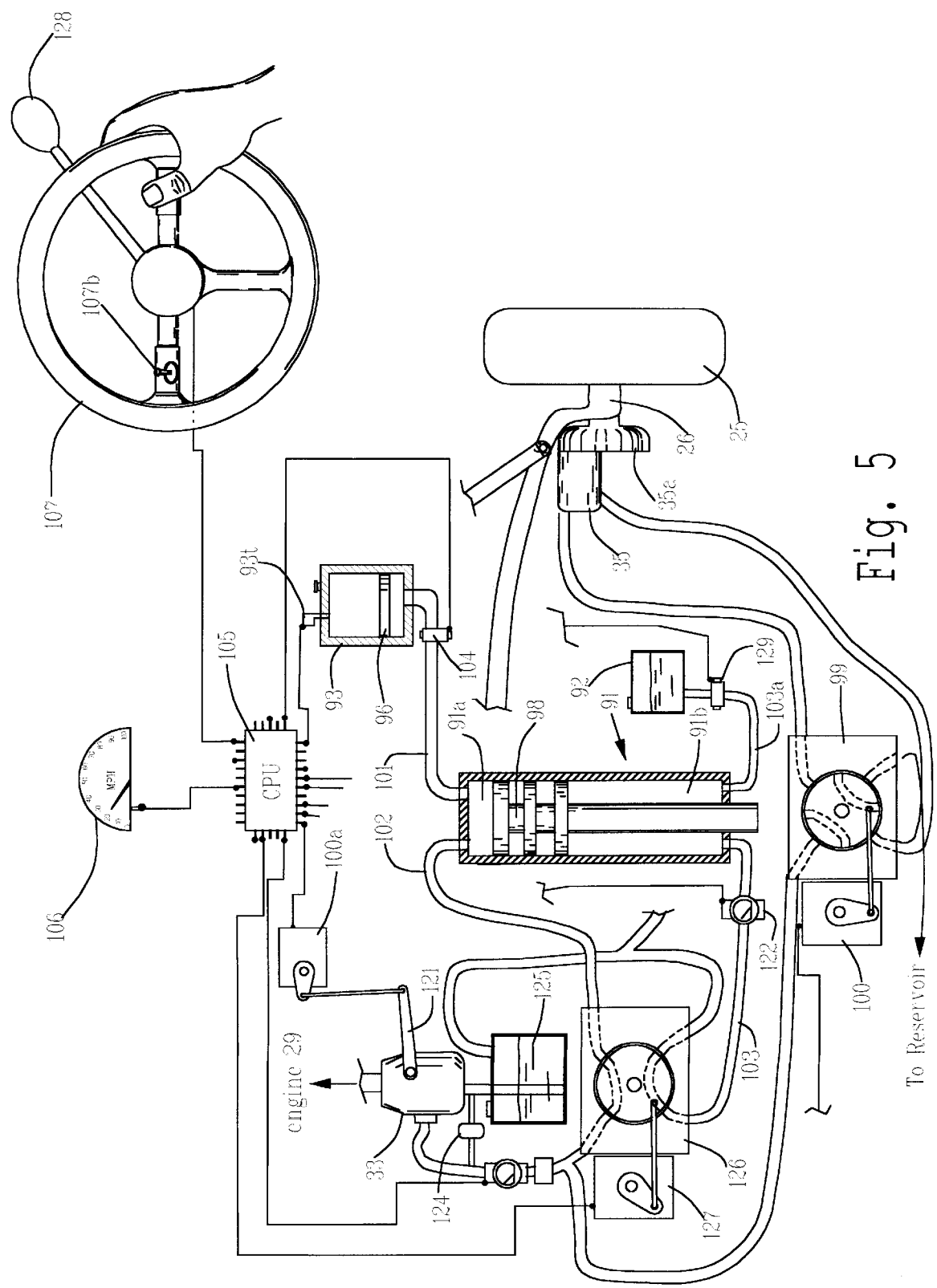
FIG. 5 represents the vehicle's hydraulic system.

In FIG. 5, details of the hydraulic power system is illustrated. The hydraulic pump 33 is directly connected to the engine 29 which supplies motive power. Instead of having a clutch mechanism between the engine and the hydraulic pump, the hydraulic pump is provided with variable-displacement mechanism, controllable via arm 121, whereby the volume of fluids moved by pump 33 per revolution is variable from as low as zero to higher up, allowing the engine to rotate while the vehicle is standing still, while the rotating core of the hydraulic pump serves as flywheel, eliminating the weight of a conventional engine flywheel. Accelerating the vehicle from standing-still position requires that the pump displacement be at low volume in order to prevent stalling or lugging of the engine, similar to low gear in an automobile. On the other hand, cruising at highway speeds requires high volume of displacement from hydraulic pump in order to avoid over-reving of the engine, similar to high gear in an automobile.

Referring to the bottom of FIG. 5, fluid flow from hydraulic pump 33 to hydraulic motors 35 is interruptible by rotary valve 99 electronically controllable by servo 100. Valve 99 allows the vehicle to be put in Park with hydraulic lock to the rear wheels 25 while the output of hydraulic pump 33 is used to power other hydraulic actuators. Valve 99 also allows reversing of the direction of fluid flow to hydraulic motor 35, allowing the vehicle to be put in reverse drive. Referring to the top of FIG. 5, the so-called "gear selector" or "speed selector" lever 128 mounted on the steering column right behind the steering wheel 107 is used to accomplish the selection of Park, Reverse, and Drive. If "automatic transmission" feature is to be provided for the vehicle, the hydraulic pump's variable displacement arm 121 is made controllable via electrical servo 100a similar to servo 100 controlled by computer 105 with input from the vehicle's speedometer 106 and other variables such as the engine throttle position, engine temperature, engine knock sensor etc.. If the propeller 5 is utilized to augment the acceleration of the hydraulic drive, then information regarding the propeller's pitch is also an important variable in determining the hydraulic pump's displacement. With "manual transmission" feature, then the selector lever 128 is linked directly to the displacement control arm 121 after the selector lever 128 is pulled past the Drive position, allowing the driver complete responsibility of controlling the "transmission" ratio, similar to, yet without having to work the clutch pedal, as in manual-transmission automobiles.

The hydraulic pump 33 also supplies hydraulic pressure to power all the hydraulic jacks or actuators as previously discussed. For example, in the middle of FIG. 5, the front wheel shock-absorbtion and suspension strut 91 is a simple piston-cylinder unit that also serves as nose-height leveling mechanism for the front wheel. The top chamber 91a of strut 91 is connected via hydraulic hose 101 to a cylindrical air chamber 93, mounted separately. Air chamber 93 is filled with an inert gas such as Nitrogen at a desirable pressure. A thin, freely-moving disc 96 inside chamber 93 serves to keep the gas and hydraulic fluid from coming into contact or preventing the gas from escaping. To serve as suspension means, the gas inside chamber 93 is compressible thereby elastically yielding to vertical impact force on piston 98. To serve as shock absorption means, there is provided a flow-regulating valve 104 serially connected to hose 101, giving a desirable amount of flow restriction of the fluid within hose 101 corresponding to the amount of shock absorption desirable. Valve 104 is preferably controllable by electrical signals from the vehicle's computer 105 rendering optimal degree of shock absorption at all conditions. Interrupting the fluid flow from pump 33 and strut 91 is rotary valve 126 controlled by servo 127, allowing reversal of direction similar to valve 99. In order for strut 91 to function in its role as suspension means, rotary valve 126 must be in the closed position therefore set the piston 98 at a desirable level. However, when valve 126 is closed, the fluids on the bottom chamber 91b of piston 98 has no where to go when piston 98 needs to go down or up in response to road shock. Therefore, it is necessary to vent the bottom chamber 91b of strut 91 via hose 103a to a small fluids reservoir 92 when valve 126 is closed. Interrupting the flow on hose 103a is another electrically powered flow control valve 129. Valve 129 must be closed when valve 126 is opened in order to prevent escape of hydraulic fluids outside of the system. Valve 129 must be open when rotary valve 126 is closed for the suspension feature in roadable mode. However, in the flight mode after the front wheel is retracted fully upward, both valves 126 and 129 should be closed in order to lock the front wheel within the wheel well.

One method of determining the relative position of piston 98 within strut 91, hence the height of the nose of the vehicle with regard to the ground, is the use of electronic flow meter 122 serially connected with hydraulic hose 103. Flow meter 122 is electrically connected to computer 105 whereby either the flow volume or flow rate is recorded and is computed, which in turn determines the action of servo 127 on valve 126 in a feed-back loop until piston 98 reaches its desired position depending on the vehicle's mode of travel.

Other important parts of a hydraulic system include a hydraulic reservoir 125, a pressure regulator 124 with a preset limit designed to protect the system from high-pressure damage, and a hydraulic fluids cooler (not shown) in order to prevent boiling of hydraulic fluids with extended use of the hydraulic wheel drive.

Figure 6:
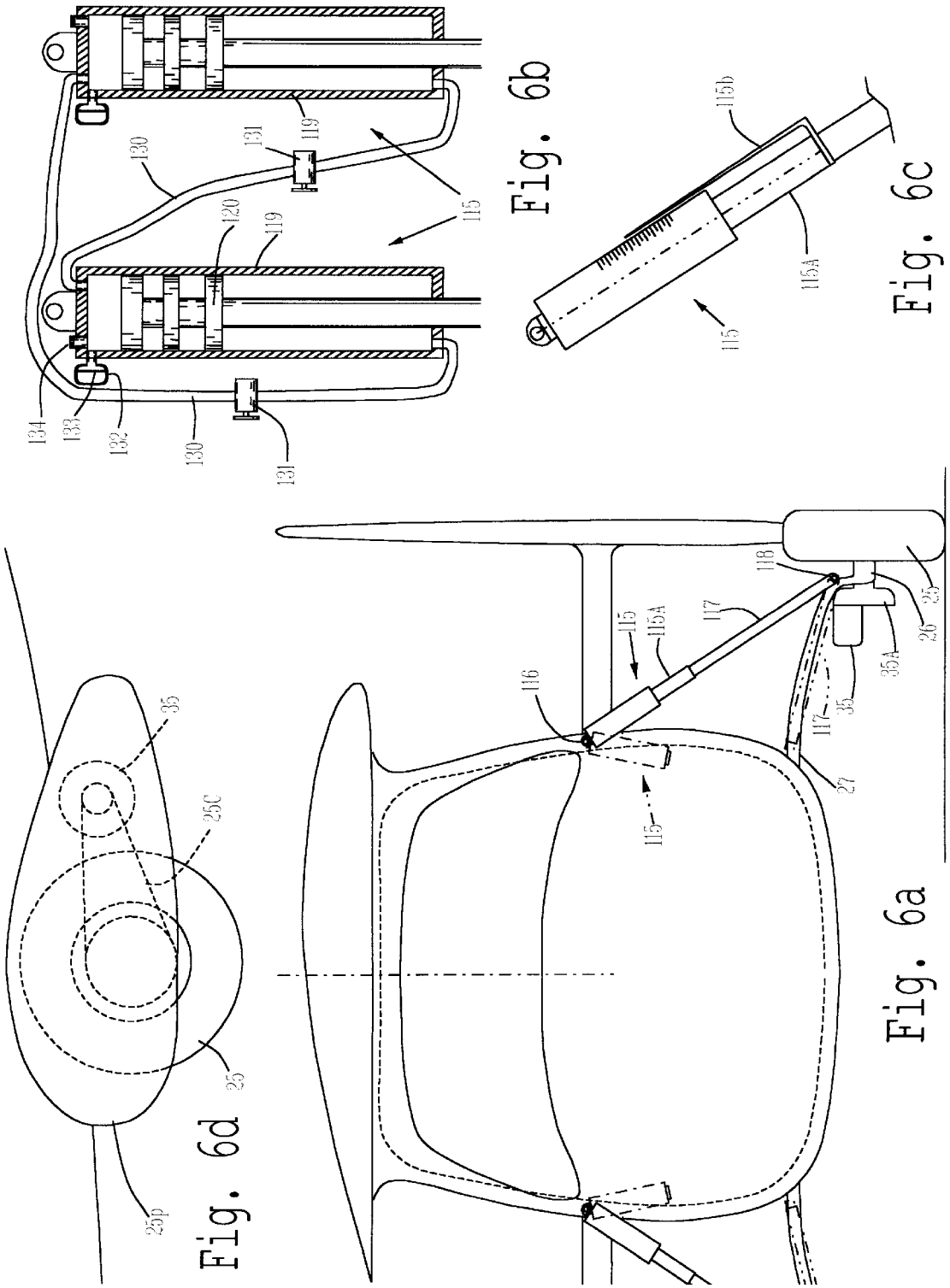
FIG. 6a shows details of the rear wheel suspension, anti-sway and shock-absorption (damping) mechanism.
FIG. 6b shows internal construction of a pair of hydraulic piston and cylinder used for the purpose of shock-absorption and as anti-sway mechanism.
FIG. 6c is a closed-up view of the rear wheel's shock-absorption strut.
FIG. 6d shows an alternate drive mechanism for the rear wheel.

Details for the suspension mechanism of the retractable rear wheels 25 is illustrated in FIG. 6a and 6b. Since the rear wheels are not steerable and have no height-leveling mechanism, their suspension mechanism is much simpler than that of the front wheels. In FIG. 6a, the rear wheels 25 are mounted to the fuselage on landing gear legs 27 which are made from elastic tubular spring steel allowing them to act as suspension means. Shock absorption and damping means is by shock struts 115 attached to the fuselage on pivots 116. The other end of the shock strut 115 is threadedly connected to a hollow shaft 117, which is pivotably attached to the outer end of leg 27 by pivots 118. In order to enable the rear wheels to be retractable into the fuselage inflight, the shock strut 115 must be disconnected by unscrewing its lower end 115a from shaft 117. The strut 115 is then stowed inside the fuselage by rotation on pivot 116 as shown in its alternate position by the phantom lines. Shaft 117 then may be disconnected from pivot 118 in order to be stored in the fuselage, or shaft 117 may simply be folded into landing gear leg 27 at pivot 118 and strapped onto leg 27 by an elastic strap (not shown). A hydraulic motor 35 integrated with a gear reduction unit 35a may be directly attached to wheel axis 26 on each side, serving as ground propulsion means as discussed.

Referring to FIG. 6b, a pair of shock struts 115 may also serve as rear wheel stabilizer (anti-sway) means, since the use of a conventional sway bar as in automotive practice is very difficult with the retractable landing gear system in this vehicle. Additionally, saving in weight and cost can be realized with additional function for the shock struts 115. A pair of shock strut 115 is used, each is comprising of hydraulic cylinders 119 and pistons 120, with hydraulic hoses 130 attached to both ends of the cylinders. The bottom end of one cylinder 119 is hydraulically connected to the top end of the other cylinder, and vice-versa. When completely filled with hydraulic fluids, it can be seen that movement of the piston 120 in one shock strut unit 115 will cause a corresponding movement in the same direction by the piston of the other shock strut. The shock absorption (damping) property of the system is provided by a pair of adjustable flow-restricting hydraulic valve 131 installed on each hydraulic line 130. Near the top of each cylinder 119 there is attached a small chamber 132 normally filled with compressed gas. The gas in this chamber 132 is separated from the hydraulic fluids by diaphragm 133. The gas' compressibility will allow a small degree of spontaneity in movement of the shock strut 115 without fully affecting the opposite shock strut in response to high velocity, highly repetitive but low amplitude road shocks. For maintenance purpose, cap 134 on top of each cylinder 119 may be unscrewed in order for the fluids level to be checked and filled.

Referring to FIG. 6a, the shock strut 115 can yet serve another important function. It can serve as a weight scale for measuring the partial weight of the vehicle on each rear wheel. Since landing gear leg 27 is of spring steel, it follows Hooke's law that the gear leg 27 will be bent upward relative to the fuselage in proportion to the weight imposed on the wheel on that side. Upward deflection of gear leg 27 will push against shock strut 115, shortening it. Thus the differential in length of shock strut 115 when attached to rod 117 is inversely proportional to the partial weight of the vehicle on that particular side. In FIG. 6c, there is shown closed up view of shock strut 115 with indicator needle 115b attached to the low end 115a of strut 115. The main body of strut 115 is engraved with calibration marks in units of weight measurement. Needle indicator 115b will therefore point directly to the amount of weight imposed on that particular landing gear leg 27.

By adding the indicated weight measurement on each sides of rear landing gear leg with the weight on the front wheels, (which is proportional to the gas pressure on chamber 93 as shown on FIG. 5), one have the total weight of the vehicle. By plugging those weight figures on the vehicle's onboard computer, the location of the aircraft CG (center of gravity) can be calculated, and thus one can quickly determine whether the CG falls within allowable range for safe flying or not. The vehicle weight and the calculated CG location may also be used, in combination with ambient temperature and barometric pressure, to determine precisely how much pitch trim is required for a desirable take off and climb out, even before ever taking off. One can further predict how much runway will be needed and what climb gradient the aircraft is capable of, if high terrain clearance is an issue after take off. In short, many fatal crashes due to improper loading or over-loading in general aviation aircraft today can be avoided with this simple device!

Referring to FIG. 6d, if a non-retractable rear landing gear is selected for purposes of saving in purchasing cost, maintenance cost and improvement in reliability, the rear wheels will be fitted with a wheel pan 25p for reduction of aerodynamic drags. For the same reason, the hydraulic motor 35 should be placed inside the wheel pan 25p behind the wheel 25, driving the wheel 25 via chain drive 25c with the similar reduction ratio as with the gear box 35a.

Figure 7:
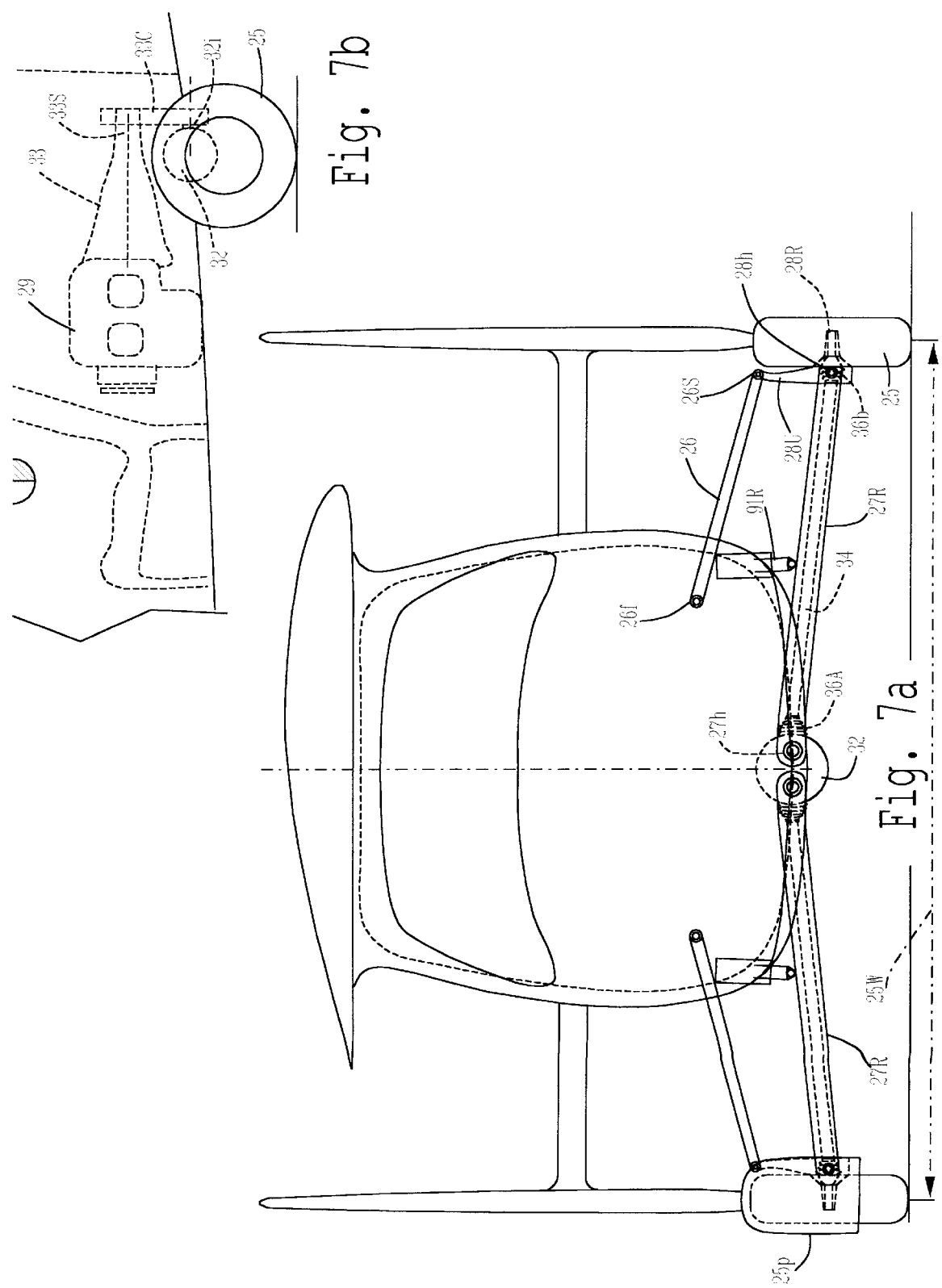
FIG. 7a and FIG. 7b are the front view and side view, respectively of an alternative non-retractable rear wheel suspension and drive mechanism, using automotive-style transmission.

Referring to FIG. 7a and 7b, if one still elects to have the rear wheels 25 to be non-retractable, the rear wheels 25 may also be driven by an automotive-style automatic transmission 33 linked to a differential gear unit 32. Transmission unit 33 is preferably a compact and light-weight unit, three-speed automatic type that is derived from a rear-wheel driven sub-compact automobile, capable of handling around 80 hp (60 Kw). The transmission output shaft 33s is linked to the input shaft 32i of differential unit 32 via chain drive unit 33c. This chain drive allows for easy and cost effective adaptation of different makes of transmissions to different makes of differential unit in low production volume. If high production volumes is anticipated, a special transaxle unit that combines a transmission with built-in differential unit may be designed that can save some weight. Referring to FIG. 7a, it can be seen that power from diffenrential unit 32 is transmitted to each rear wheel 25 via drive axle shaft 34. On each ends of axle shaft 34 are constant-velocity (CV) joints 36a and 36b in order to allow vertical movement of each rear wheel independently, hence independent suspension.

For arerodynamic efficiency, axle shafts 34 are enclosed within hollow landing gear leg 27r. Therefore, landing gear leg 27r must necessary be rigid instead of springy like previous type. This necessitate the use of a suspension and shock struts 91r. Struts 91r may be of the same internal construction as struts 91 in front, and as such, struts 91r may also be used as height leveling means for the rear wheels as well, with mechanism already discussed in FIG. 5. The ability for height leveling for the rear wheels is important in many respects.

First of all, by lowering the rear end of the vehicle simultaneously with raising the nose of the vehicle, a further 3–4 degrees of upward rotation is possible in additional to the 4 degrees of rotation provided by the height leveling front wheels. Those, in additional to the 2–3 degrees of angle of incidence built in to the wing-fuselage junction, means that there is now up to 11 degrees of angle of attack available for take-off. For a high camber airfoil with flap, this 11 degrees represents about 100% of lift co-efficient available, not even accounting for the further increase in lift co-efficient due to ground effect. This means the shortest take off possible in any aircraft, and it is particularly useful in short or rough runways. This means better take off performance than any conventional tri-cycle gear aircrafts, since these aircrafts must use down force from the horizontal stabilizer to rotate the nose up prior to take off. In doing so, the down force from the tail adds more effective weight and drags to the aircraft thus preventing it from lifting off as quickly as the conventional tail-dragger type of landing gear aircrafts.

Secondly, with independent height-leveling on each wheel, it is now possible to allow the vehicle to tilt into the direction of the turn, thus preventing it from rolling over and increasing its lateral acceleration. The increase in lateral acceleration is due to the fact that in a turn, the vehicle's center of gravity is shifted outward due to centrifugal force. This adds more weight on the set of wheels on the outside of the turn, and thus increases the weight/tire contact surface ratio, hence decreases lateral acceleration. By tilting the vehicle into the turn, more even weight distribution on all 4 wheels is possible, hence decreases the weight/tire contact surface ratio and increases "road-grip" or lateral acceleration. Furthermore, being able to tilt the vehicle to one side greatly increases the vehicle's resistance to the effect of strong cross wind when driving in the highway or during taxiing, take off or landing. The mechanism to accomplish is mostly described in FIG. 5, by action of hydraulic strut 91, hydraulic pump 33, and appropriate valving means. A sensing means is necessary to detect uneven weight on one side of the vehicle versus the other side. Referring to FIG. 5, the weight on each wheel is proportional to the pressure on respective air chamber 93. Thus, the only sensing means needed is an electronic pressure transducer 93*t* installed in each respective air chamber 93 for each wheel. This pressure is then relayed to the vehicle's computer 105 which in turn activates each rotary valve 126 as appropriately to minimize the pressure differential from each side. The driver should also be able to manually control the tilting of the vehicle when the needs arise, for example, before making a tight turn, via control buttons 107*b* on the steering wheel 107.

By allowing the computer to know the weight on each wheel, the pressure transducer 93*t* also allows the computer to calculate the aircraft's center of gravity location as well as the entire weight of the vehicle, hence the computer is able to warn the pilot when the aircraft is overloaded or is loaded with CG 17 outside of the safe range for flying. With more reliable computer technology forthcoming, it is possible to program the computer to refuse to allow the aircraft to take off altogether. This may be done by several means, for example, since the computer controls the engine fuel injection and ignition, it may just decide to stall the engine just as take off run is initiated should the pilot decides to ignore the computer's warning regarding overloading or unsafe CG location.

Thirdly, the active height leveling of all wheels means that the passive anti-roll mechanism as discussed in conjunction with FIG. 6*b* is no longer needed, hence potential for modest weight and cost saving. More importantly, without the passive anti-roll mechanism, which links the suspension on one side to the other side making it stiffer, the ride suspension is now much softer. Thus, one has in one combination the road handling of a sport car with the ride comfort of a classic full size American luxury sedan.

The rigid landing gear leg 27*r* further requires a multi-link suspension design such as the short-arm, long-arm suspension design (SLA) as shown in FIG. 7*a* in order to maintain constant wheel track width throughout the range of vertical travel of wheel 25. In FIG. 7*a*, the rigid landing gear leg 27*r* serves as the long control arm, which is attached to and articulates with the fuselage at hinge joint 27*h*. The outer end of the long control arm 27*r* articulates with the rear wheel spindle 28*r* at hinge joint 28*h*. Spindle 28*r* has an extension arm 28*u* extending upward that articulates with the short control arm 26. As in automotive practice, the short control arm 26 is V-shaped, and it is attached to the fuselage frame via 2 hinge joints 26*f* which are aligned longitudinally front and rear. The V-shaped control arm 26 is only attached to spindle 28 via one hinge joint 26*s*. As can be seen, as the wheel 25 moves up or down, this unequal-arm suspension design allows for subtle changes in wheel camber in order for the wheel track width 25*w* to remain constant, hence avoiding tire scuffing with road surface that leads to accelerated tire wear and decreased in road traction.

Figure 8:
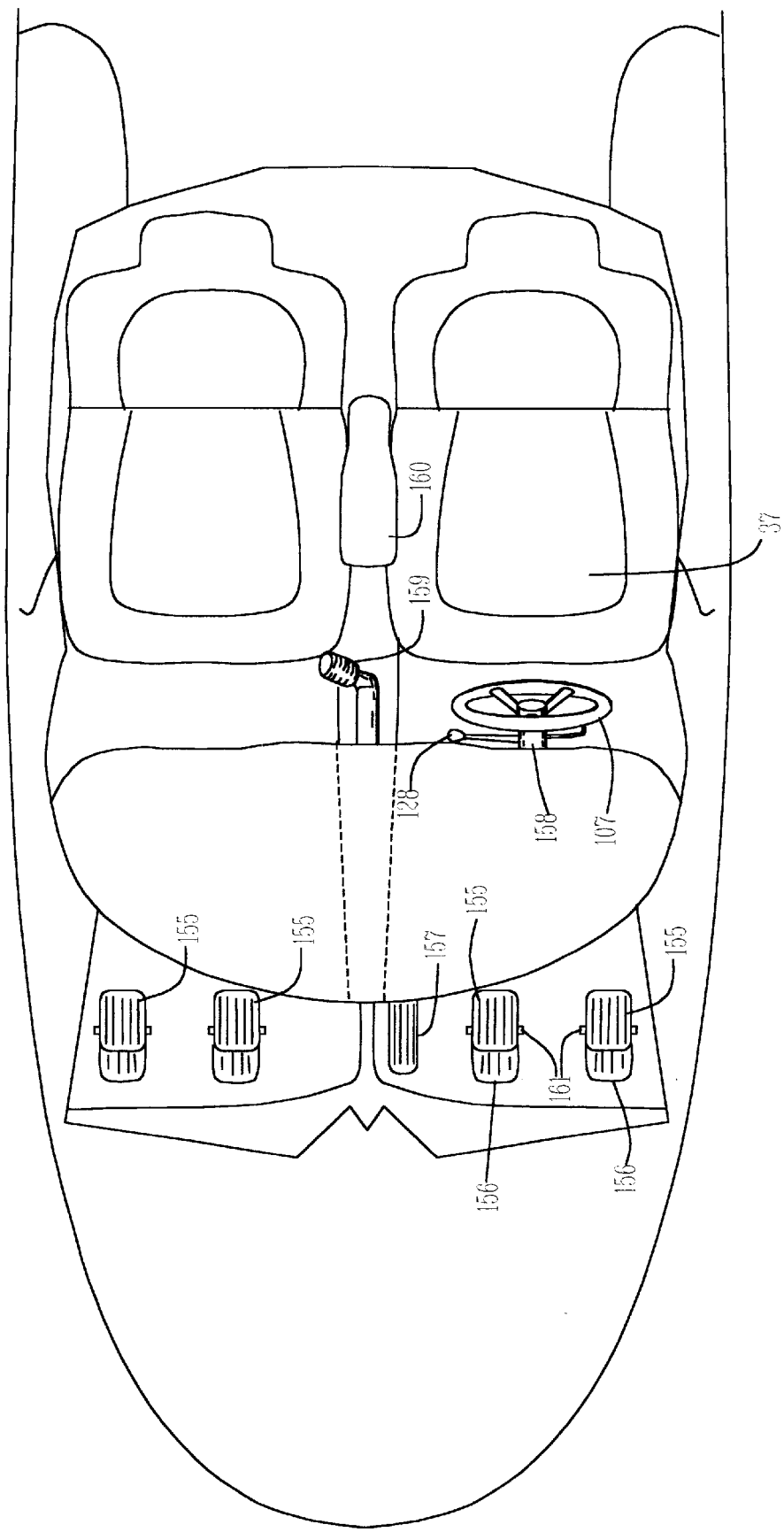
FIG. 8 is layout of the vehicle's cockpit control arrangement.

FIG. 8 shows the aircraft's unique cockpit layout. As discussed, for maximum safety and convenience, this air-ground vehicle must have cockpit control arrangement common to both automobile drivers and airplane pilots. For flying, pitch and roll axes are controlled by a single joystick 159, placed in between the two front seats 37. This makes the joystick 159 accessible to both front seat occupants in case of emergency, or for training purpose. Furthermore, the pilot's arm is well supported by armrest 160, preventing unwanted control input to the joystick 159 in turbulent air when an unsupported arm holding the joystick tends to flop around. Rudder and brake control is via the two rudder pedals 155 placed in conventional position. The rudder pedals are slidable forward and backward for rudder control and they are also pivotable on axes 161 for differential toe braking with the pilot/driver pushing his toes against pedal tip 156 as in conventional aircraft. For braking while in roadable mode, both feet are used as in aircraft toe-braking action, as soon as the right foot is lifted off the gas pedal 157.

As shown earlier, steering in the roadable mode is via conventional automotive style steering wheel 107 linked to rack-and-pinion linkage to the front wheel. Transmission control is via speed selector lever 128, whether manual or automatic transmission option is chosen.

Figure 9:
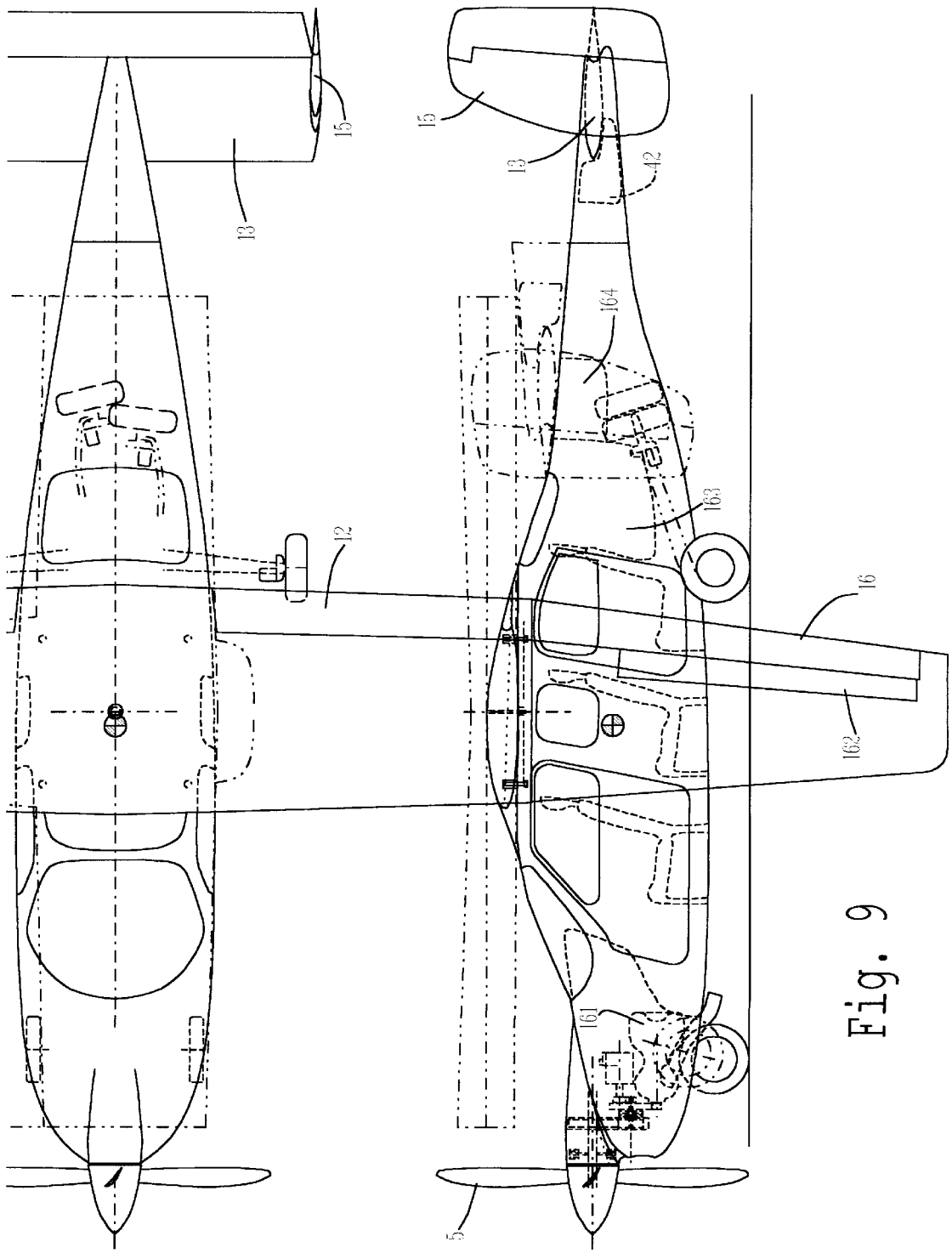
FIG. 9 is another layout of this vehicle using front-mounted turbine engine, making possible another row of passenger seats, increasing seating to six.

FIG. 9 is a "corporate" version of the vehicle, fitted with a turbine engine 161 in the nose of the aircraft for improved performance and reliability. In order to save on development costs and tooling costs, the turbine-aircraft version will share basically the same airframe dimension and structural design with the piston-aircraft version with exception of internal strengthening and lengthening of the tail end of the fuselage by about 1.5 ft (0.45 m). An adaptation of the Allison 250 turbine engine family may be used, with rating of about 650 thermodynamic shp (481 kw) flat rated to about 420 shp (31 Okw) to accomodate a smaller size propeller and reduction gearing. Even the propeller blades 5 may be exactly the same as the previous version, but with four blades instead of 2 or 3 blades, in order to absorb the extra power. The engine should be designed to maintain its flat rated 420 shp (31 0kw) up to about 10,000 ft enabling the aircraft to cruise at 300 mph (480 kph) at 25,000 ft. The reason that the turbine engine may be placed in the nose of the aircraft and that the piston engine may not is because of the lighter weight and more compact size of the turbine engine. Being a corporate aircraft, this vehicle should comes standard with cabin pressurization and full cabin luxury, full de-icing, anti-icing mechanisms, protection against lightning strike, and all advance avionics for all-weather capability. Some of those additional equipments may be placed below the rear luggage compartment 163 behind the rear seats to help balance the weight of the engine in front. Likewise, some of the reserved fuel capacity may be placed in the rear fuel tank 42 as previously discussed in order to further help balancing the aircraft. The aircraft may also be equipped with a rocket deployed parachute recovery system 164 placed behind the luggage compartment for safety against structural failure or irrecoverable lost of control. The lower weight of the turbine engine certainly will help keep down the aircraft's wing loading given those extra weights, but even then, with a required useful load of about 180 lbs (818 kg) in order to be able to carry 6 adults with reasonable luggage allowance and adequate range, the aircraft's gross weight is projected to be above 4000 lbs (1818 kg), making its wing loading to be above 30 lbs/ft$^2$ (146 kg/m$^2$). Therefore, in order to bring the stall speed down to 61 kts or below in order to satisfy FAR part 23 requirement, the aircraft should be equipped with full span flaps at the wing trailing edge, by using the usual flap surface 12 with the aileron surface 16 converted to use as flap. Roll control is done by spoilers 162 on the wing outer panels when the flaps are deployed.

Figure 10:
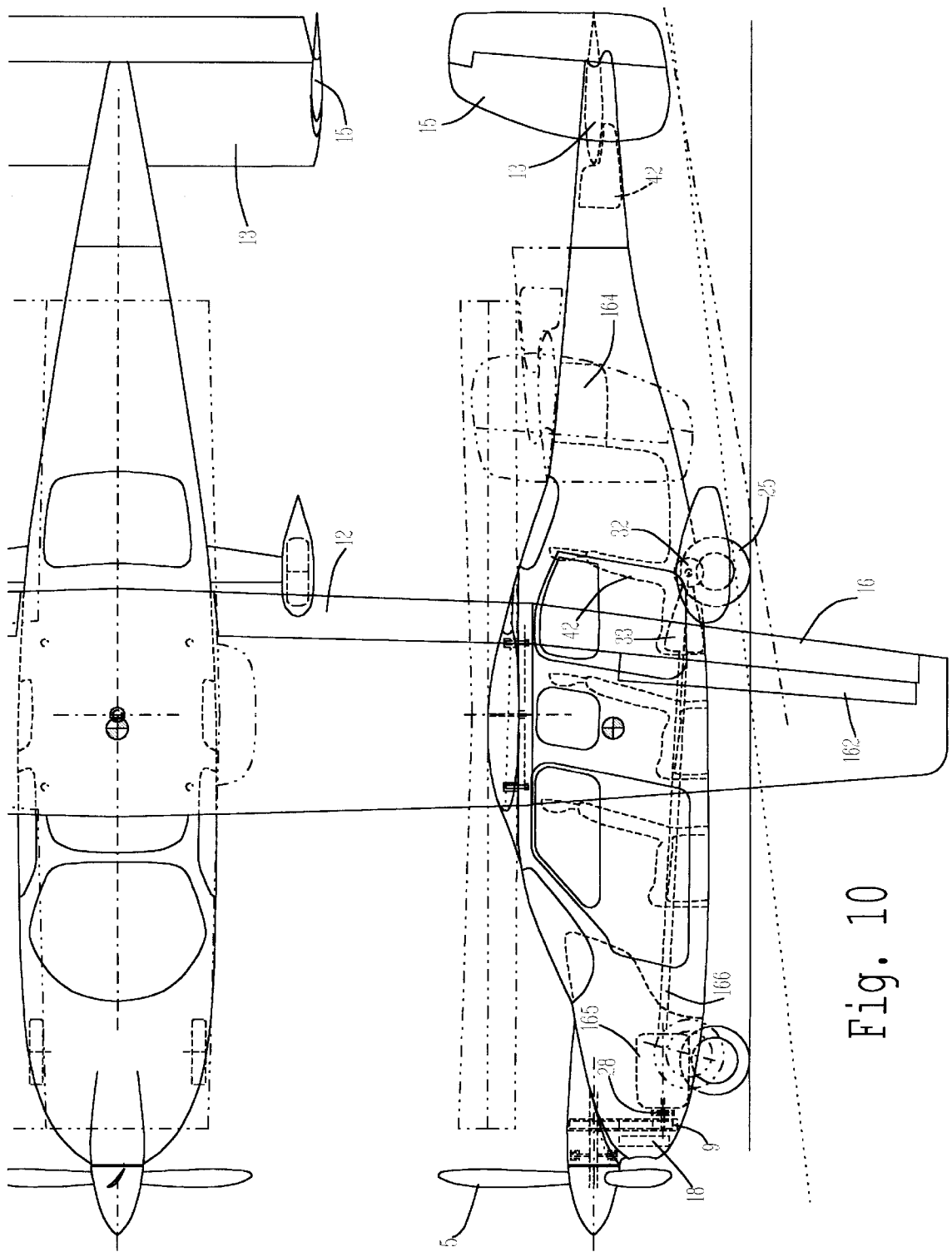
FIG. 10 is yet another layout of this vehicle, a low-cost six-seat version, using Wankel rotary engine, automotive-style transmission and non-retractable rear wheels.

Referring to FIG. 10, for those who desires to have a six-seat roadable aircraft of the same design but cannot afford the high acquisition cost of a turbine engine unit in the corporate version, an alternative is available. It is done by replacing the turbine engine unit 161 with a turbocharged Wankel rotary engine unit 165, such as that of the Madza RX-7 sport car, rated at 260 hp (192 kw). This engine is considerably more compact and lighter than a piston powered engine of similar power unit. Still, such an engine is considerably heavier than the turbine engine that it replaces, such that it may be necessary to place the transmission unit 33 linked to a differential unit 32 behind the center of gravity and below the last-row seats 42, driven by a drive shaft 166. The rear wheels thus are not retractable, allowing further cost saving, while possessing all of the aforementioned advantages of the multi-link short-long arm rear suspension mechanism with rear wheel height leveling. To minimally qualified as a six-seat aircraft, it must have a useful load capacity of at least 1400–1500 lbs (636–681 kg), and this leads to a gross weight of at least 3500 lbs (1590 kg). Because of this, a full-span flap system as mentioned is highly desirable and may well worth the extra cost.

For those desiring a low-cost, fixed gear 4-seat aircraft with a front-mounted engine and a long fuselage with long tail-arm moment for extra stability (in the tradition of the venerable and the best selling aircraft the Cessna 172), it is possible to replace the rotary engine 165 with a small and light weight 4-cylinder in-line automobile engines (not shown) such as that of the Accura Integra 1.8 liter 175 hp (130 kw) or Toyota Turbo Celica 2.0 liter 200 hp (148 kw). Appropriate modifications of those engines are necessary in order for them to withstand to the heavier duty-cycle of an aircraft engine, but with today's advance engine technology, such are well within realms of feasibility. The extra efficiency of this aircraft design means that reasonable cruising speed can be attained at lower engine power than previous generation of aircraft, thus aiding in improving engine longevity.

Referring to FIG. 11b, for those who are not comfortable with driving a vehicle with a maximum width of nearly 8.5 ft (2.6 m), it is possible to reduce the vehicle's maximum roadable width to less than 7 ft (2.1 m) and still maintain sufficient stability against rolling-over. This is accomplished by keeping the center of gravity (CG) 17 as low as possible. For example, in FIG. 11a, the CG 17 is kept at about 2.8 ft (0.85 m) above the ground, as illustrated by vector 168 representing the gravitational force on the vehicle. Referring to FIG. 11b, during a violent turn with maximum lateral acceleration of 0.7 G representing the limit of static friction of rubber tires on dry asphalt, the length of displacement vector of the CG away from the center line 172 is only about 2.8×0.7=1.96 ft (0.59 m), as represented by vector 169. For horizontal acceleration of 0.7 G with both forward and lateral components as in maximum braking while turning, the CG will be displaced within boundary of curve 174 with radius 170 equal to the length of vector 169. As shown by line 171 formed by intersecting the outer edges of front wheel 23 and rear wheel 25, the vehicle will not roll over unless the CG is moved beyond the boundary of line 171. Therefore, as one can see, a good margin 173 against rolling over is available, provided that the vehicle is protected from excessive leaning-over with a good anti-sway (or anti-roll) mechanism, as discussed. The margin 173 is even better is the vehicle is equipped with the active anti-roll mechanism as discussed in connection with FIG. 7a and 7b.

To keep the horizontal stabilizer 13's width to less than 7 ft (2.1 m), it is necessary to move the vertical fins 15 somewhat inboard, and to provide the stabilizer 13 with a detachable or foldable tips 13t. The detachment mechanism for stabilizer 13 and the tips 13t may be similar to that of the detachable lower end 15b of the left vertical fin 15 as discussed in conjuction with FIG. 1g. The detached portion 13t may be stowed either inside or outside of the vehicle wherever space is available. The area of the horizontal stabilizer 13 is enlarged from 25 ft$^2$ to 30 ft$^2$ (2.25 to 2.7 m$^2$) to compensate for the decreased in efficiency of stabilizer 13 as the results of increased tip vortex flow on stabilizer 13 as the vertical fins are moved inboard.

Figure 12:
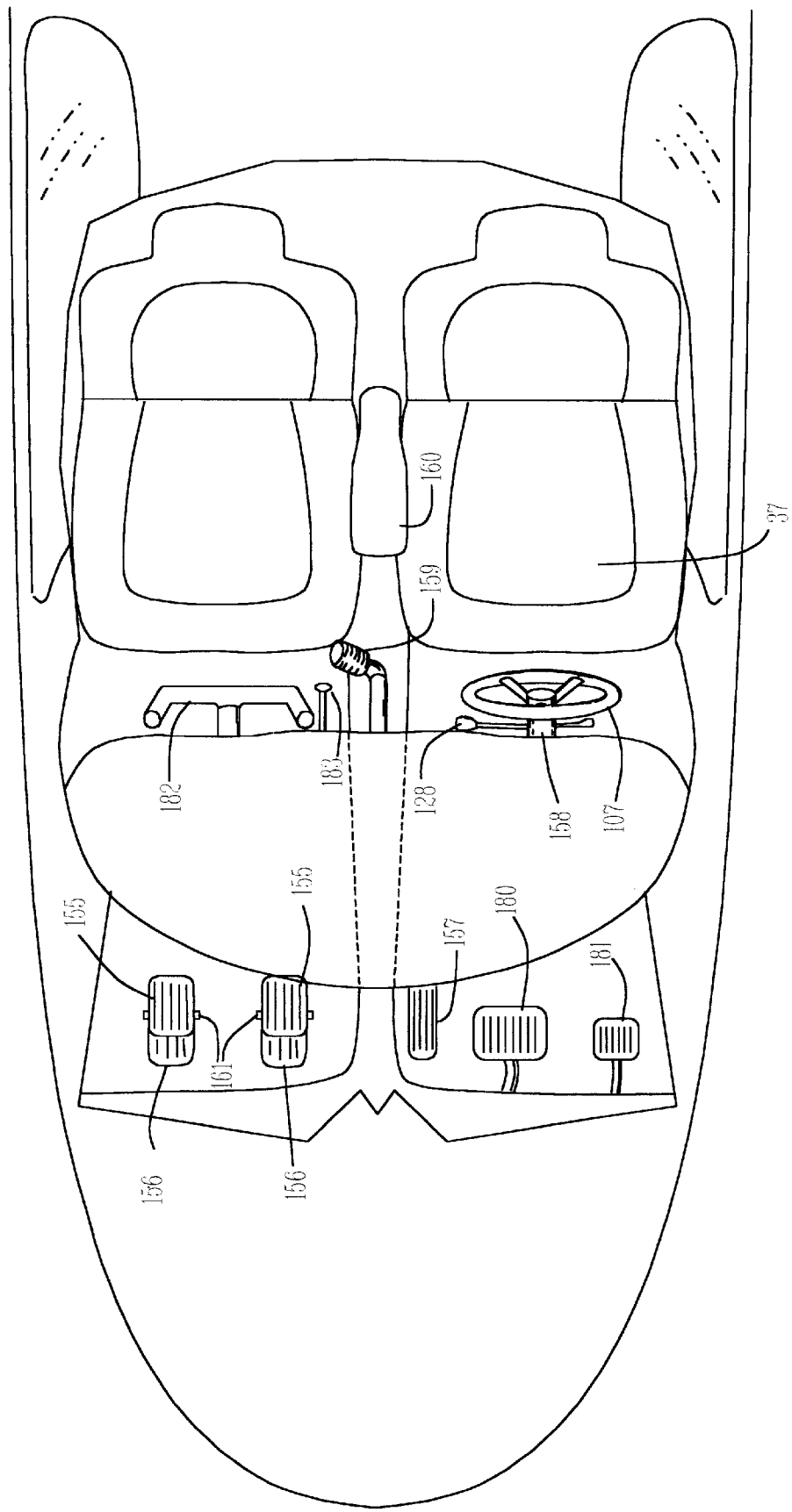
FIG. 12 represents a different cockpit layout, with the left side of the cockpit designed mainly for driving in the ground and the right side of the cockpit equipped for flying.

By the same token, referring to FIG. 12, for those who are not comfortable with or cannot get familiar with braking the vehicle using both feet with toe braking action while driving in the road, it is possible to brake the vehicle using the automotive-style one single brake pedal 180 on the left front seat. The right front seat retains the rudder pedals as yaw controlling device and toe braking as in conventional aircraft. Those who are more familiar with flying airplanes with two hands using conventional aircraft control yoke 182 as a pitch-and-roll control device instead of using a one handed joystick 159 in the middle of the cockpit should find relief with the control yoke 182 on the right front seat, with the throttle lever or knob 183 right where it is supposed to be. Thus, roadway driving is done from the left front seat, and flying is done from the right front seat, with all familiar control levers and instrument arranged in the most familiar way for either mode. This is most valuable in cases of emergency, during which times, one tends to react reflexedly according to previously trained habit. The only difference is that for low speed ground steering just prior to take off or right after landing, one will need to use the left hand reaching over to the left side to turn the steering wheel 107. As the soon as the aircraft picks up speed and with additional blast from the propeller, the aircraft should be responsive to the rudder steering by the rudder pedals 155, because the front wheels are put in significant caster for this purpose and should caster freely thus offer almost no resistance to the yaw forces from the rudders. Emergency ground steering at low speed may be done by differential toe braking on the toe end 156 of the rudder pedals 155, as in conventional aircraft.

The center control joystick 159 for controlling the aircraft's elevator and ailerons may be retained so that the "pinch-hitter" pilot on the left seat can take over control of the aircraft should a medical emergency happens to the PIC (pilot in command) on the right seat, or for training purpose. In this situation, rudder control may be done by the steering wheel 107 controlling the rudders via electric servos, or simply via the electric rudder trim tab servos already installed in the aircraft albeit with somewhat less control authority.

Another added advantage for this control arrangement is that there is now enough foot room in the left front seat for a clutch pedal 181, for use with manual transmission in the roadable mode. The elimination of automatic transmission in this vehicle results in additional saving in weight and cost, because an automatic transmission unit is always much heavier, more expensive and has poorer performance than a comparable manual transmission unit.

SUMMARY, RAMIFICATION AND SCOPE

Accordingly, the reader will see that the easily-convertible high performance aircraft of this invention is not just an aircraft with speed and range comparable to a typical high performance light aircraft, but it has far greater utility than the conventional fixed-winged aircraft. Unlike most of the roadable aircraft designs of the prior art that must undergoes complex and time-consuming conversion from the roadable mode to the flight mode, this invention allows for easy and rapid conversion from roadable mode to flight mode within minutes, by a single person in an open field in wind exceeding 20 mph (32 kph), thus opens up far more traveling flexibilities than the current airport-dependent conventional aircraft. Far too many lifes have been lost when pilots of light aircrafts attempted to take off or land in unsuitable airport condition, such as in strong cross wind, too high terrain surrounding the airport, too low air density, poor weather etc.. because the pilot simply has little choice. Pilots of an easily-convertible aircraft, on the other hand, simply drive to a more suitable location for take-off or landing at better airstrip and then driving to the final location, or simply drive on the highway until more suitable weather or geography is encountered.

While I have shown and described in considerable details what I believe to be the preferred form of my invention, it will be understood by those skilled in the art that the invention is not limited to such details but may take various other forms within the scope of the claims that follow. For example, the very simple and light-weight but highly effective wing folding and rotation arrangement as well as the tail folding method may be utilized in a non-roadable aircraft for great reduction in hangar space hence storage cost, and in making the aircraft compact enough for ground towing or for transportation in a flat-bed truck trailer (similar to towing a recreational boat by a pick-up truck).

What is claimed is:

1. In a roadable fixed-wing flying vehicle designed to operate effectively both in the air and in the roadway, said vehicle having a center of gravity, a longitudinal axis, a fuselage, a width, a top, a front section, a center section with a rear end, and a tail section, the combination comprising:

ground-supporting system having a front ground-supporting means disposed at the front section of the vehicle, and a rear ground-supporting means mounted behind the center of gravity, an air-propulsion means for propelling said vehicle while flying in the air, a wing fixedly mounted to the fuselage in flight, said wing having wing-folding means allowing said wing to retract to a narrow width suitable for roadway traveling, a horizontal stabilizer means disposed at the tail section of the fuselage, comprises of at least one elongated horizontally oriented surface having two opposite ends each thereof is disposed on each side of the longitudinal axis of the vehicle, a vertical stabilizer means comprises of at least two vertically oriented surfaces each thereof is mounted onto said horizontally oriented surface on each side of the longitudinal axis, a tail-folding means wherein said tail section of the fuselage is pivotably mounted to the rear end of said center section of the fuselage, allowing the tail section of the fuselage to pivot forward and backward in a vertical plane parallel to the longitudinal axis of the vehicle at an approximately 180-degree arc, between an extended position for flying wherein said tail section trails the rear end of said center section of the fuselage, and a folded position for roadability wherein said tail section is folded overlapping a portion of the center section of the fuselage, thereby allowing the fuselage to be considerably shortened for roadway operation yet still keeping said horizontal stabilizer generally parallel chordwise to the longitudinal axis of the vehicle in order to minimize aerodynamic drag in the roadable mode, said tail-folding means is comprised of:

hinge means disposed on an upper corner of the rear end of the center section of the fuselage for connecting the tail section to the center section of the fuselage, allowing said pivoting motion of the tail section with respect to the center section, locking means for releasably locking said tail section of the fuselage in said extended position for flying, and, securing means for releasably securing said tail section of the fuselage in said folded position for roadway operation.

2. The combination of claim 1 wherein the locking means further comprises of:

a set of flanges extending from a bottom corner of the rear end of the fuselage's center section and another set of flanges extending from an adjacent bottom corner of the tail section, said flanges overlap one another and have matching holes allowing locking pins to penetrate through said holes, thereby locking said flanges tightly in place and allowing the tail section to be rigidly fixed in extended position for flying.

3. The wing-folding mechanism of claim 1 wherein said wing is rotatably mounted on top of said fuselage on a wing pivot mechanism whereby said wing is horizontally rotatable between a flight position with the wing span approximately orthogonal to the fuselage's longitudinal axis and a roadable position with the wing span approximately parallel to the longitudinal axis of the fuselage, thereby allowing the vehicle to have a maximum width within legal limit for use in the roadway.

4. The wing folding-mechanism of claim 3 wherein said wing is further comprised of a center panel and two outer panels foldably attached to said center panel by a wing-folding means allowing said outer panels to overlap on top of said center panel in a folded position, and allowing said outer panels to extend laterally from said center panel in an extended position.

5. The combination of claim 1 wherein:

the rear ground-supporting means comprising of a pair of rear wheels mounted on opposite sides of the longitudinal axis of the vehicle, substantially behind the center gravity of the vehicle and substantially outside of the width of the fuselage, thereby providing stability to the vehicle against flipping-over and against strong cross-wind, and the front ground-supporting means comprising of a pair of front wheels disposed on opposite sides of the longitudinal axis of the vehicle, said pair of front wheels are spaced apart significantly closer together than are the pair of rear wheels, generally within the width of the front section of the fuselage, said front ground-supporting means combines nose-height leveling and wheel retractability by action of a simple vertical motion of the front wheel, with capability for steering of the front wheel at all range of vertical travel thereof, thereby reducing weight and cost of an associated suspension and height leveling mechanism, said steerable wheels are retractable into the front section of the vehicle, thereby reducing aerodynamic drags while in flight.

6. The combination of claim 5 wherein the front ground-supporting means is capable of suspension, shock-absorption and nose-height leveling actions, further comprising:

a pair of long hydraulic struts, each of said struts is fixedly disposed at the front section of the vehicle, laterally on opposite sides of the vehicle's longitudinal axis, each of said struts having a piston portion slidingly fitted within a cylindrical portion, a pair of wheels each thereof is attached to a steering axis assembly, said steering axis assembly is directly attached to a lower end of said piston portion of respective hydraulic strut, whereby said piston portion is solely capable of resisting linear horizontal and vertical stresses imparting on the wheel, and whereby any amount of vertical linear movement of said piston portion directly causes a correspondingly equal amount of vertical movement of the vehicle's front section.

7. The combination of claim 6 wherein a front-wheel steering system is provided, further comprises:

a pair of said steering axis assemblies having an outer end and an inner end, fixedly attached to the lower end of the piston portion of respective hydraulic strut, a telescopic link disposed horizontally having opposite ends thereof, each of said opposite end is pivotably attached to the respective inner ends of said steering axis assemblies, allowing independent vertical motion of each of said steering axis assemblies with respect to each other, while keeping said steering axis assemblies from rotating with respect to the hydraulic strut on respective side, a pair of spindles for rotatably mounting said pair of front wheel, each of said spindle is horizontally pivotable with the outer end of respective steering axis assembly via an upper and a lower hinge joints, each of said spindle has a spindle arm for receiving steering forces, a pair of wish-bone assemblies each thereof is disposed along side of each of the hydraulic strut on each side, said wish-bone assembly has a lower hub rotatably mounted generally at the level of the lower end of the piston portion of the hydraulic strut and an upper hub rotatably mounted generally at the level of the lower end of the cylindrical portion of the hydraulic strut, said wishbone assembly has an upper V-arm articulated in a vertical direction with a lower V-arm via a pivotable joint, said upper V-arm also articulates vertically with said upper hub and said lower V-arm vertically articulates with said lower hub, a pair of steering input arms fixedly attached to respective upper hubs on each side, said input arms are articulately linked by a tie rod, and at least one of said input arm is further connected to a steering rod for receiving steering input from the cockpit, and, a pair of steering output arms fixedly attached to respective said lower hubs on each side, said output arms are connected to said spindle arms via a pair of steering output rods on respective sides for transmitting steering forces to the front wheels.

8. The steering system of claim 7 further comprises a steering wheel connected to a steering shaft, said steering shaft has an end attached to a pinion gear, said pinion gear is mated to a steering rack, said steering rack is linked to the steering rod for transmitting steering forces from the cockpit occupant to the front wheels.

9. In a roadable flying vehicle designed to operate effectively both in the air and in the roadway, said vehicle having a center of gravity, a longitudinal axis, a fuselage with a cockpit for housing an operator, a width, a top, a front section, a center section with a rear end, and a rear section, the combination comprising:

an air-propulsion means for propelling said vehicle while flying in the air, a wing having wing folding means allowing said wing to retract to a narrow width suitable for roadway traveling, a vertical stabilizer means and a horizontal stabilizer means mounted at the rear section of the fuselage, ground-supporting system having a front ground-supporting means disposed at the front section of the vehicle, and a rear ground-supporting means mounted behind the center of gravity, wherein:

the rear ground-supporting means comprising of a pair of wheels mounted on opposite sides of the longitudinal axis of the vehicle, substantially behind the center gravity of the vehicle and substantially outside of the width of the fuselage, thereby providing stability to the vehicle against flipping-over and against strong cross-wind, and the front ground-supporting means comprising of a pair of wheels disposed on opposite sides of the longitudinal axis of the vehicle, generally within the width of the front section of the fuselage, said front ground-supporting means combines nose-height leveling and wheel retractability by action of a simple vertical motion of the front wheel with steering of the front wheel at all range of vertical travel, said steerable wheels are retractable into the front section of the vehicle, thereby reducing aerodynamic drags while in flight.

10. The vehicle of claim 9 wherein the rear ground-supporting means further comprises of anti-sway means whereby upward displacement of the wheel on one side of the vehicle causes a corresponding upward displacement of the wheel on the other side of the vehicle, thereby preventing excessive leaning of the vehicle in a tight turn that may lead to a complete roll-over.

11. The vehicle of claim 9 wherein both the rear ground-supporting means and the front ground-supporting means further comprise of height-leveling means for independently raising and lowering each wheel of the vehicle in order to improve ground handling of the vehicle by tilting the vehicle into a desirable inclination angle, said height-leveling means is comprised of a hydraulic strut assembly with a variable length, wherein the length of said hydraulic strut assembly is controllable by the vehicle's operator via hydraulic mechanism.

12. The vehicle of claim 9 wherein the rear ground-supporting means is retractable into the fuselage, further comprises of:

a pair of landing gear legs each having an outer end protruding significantly outside of the fuselage's width, said landing gear legs are made of elastic material thereby serving also as suspension means, a pair of wheels rotatably mounted on each outer end of said landing gear legs, landing gear retraction means for completely retracting said rear ground-support means into the fuselage while in flight, and, shock-absorption means and anti-sway means combined in a hydraulic strut means, thereby allowing for energy absorption of the rear wheels in rough road condition as well as preventing excessive leaning or swaying of the vehicle in a tight turn that can lead to complete roll-over.

13. The hydraulic strut means of claim 12 comprises of:

a pair of hydraulic struts filled with hydraulic fluids, each one of said strut is disposed on a lateral side of the vehicle, each of said strut is removably connected from the outer end of the landing gear leg to the respective lateral side of the fuselage each of said strut having a piston and a cylinder, wherein said piston partitions said cylinder into a top compartment and a bottom compartment, pressure hose means with a flow-restricting means hydraulically connecting the top compartment of one strut to the bottom compartment of the other strut on the other side of the vehicle, and vice versa, thereby causing simultaneous shock absorption by virtues of the flow-restricting means and anti-sway property since upward force on one strut causes similar upward force on the other strut causing upward movement of the wheel on each side simultaneously.

14. The rear ground supporting means of claim 9 wherein the rear wheels are propelled via a gear-reduction type transmission, necessitating a multi-link short-long arm suspension system, comprising:

an engine mechanically linked to said transmission unit via a dutch means, a differential gear unit receiving rotational output from said transmission, a pair of long control arms each having an outer end, each of said control arm is disposed in a symmetrically spaced-apart relationship with the longitudinal axis of the vehicle, said long control arms have hollow cores, a pair of drive axle shafts journaled through the hollow cores of said long control arms, said drive axle shafts link said differential unit to the rear wheels via constant-velocity joints at each junction, allowing independent suspension, each of said rear wheels is mounted on a spindle having an upper hinge joint and a lower hinge joint, said spindle is pivotably attached to a respective outer end of said long control arm via said lower hinge joint, a pair of V-shaped short control arms, each of said short control arm is pivotably attached to the upper hinge joint of said spindle on respective side, suspension and shock-absorption means comprising of a telescopic strut assembly disposed generally in a middle section of each of the long control arms, resiliently linking said long control arm to the fuselage, and, a plurality of hinge joints connecting the long control arms and short control arms to the fuselage thereby allowing significant vertical displacement of the rear wheels with minimum change in wheel camber.

15. The suspension system of claim 14 further comprising of height-leveling means for raising and lowering the rear section of the vehicle with respect to the road, said height-leveling means is comprised of a hydraulic strut with a variable length, wherein the length of said hydraulic strut assembly is controllable by the vehicle's operator via hydraulic mechanism.

16. The front ground-supporting means of claim 9 wherein suspension, shock-absorption and nose-height leveling actions are accomplished by:

a pair of long hydraulic struts, each of said struts is fixedly disposed at the front section of the vehicle, laterally on opposite sides of the vehicle's longitudinal axis, each of said struts having a piston portion slidingly fitted within a cylindrical portion, a pair of wheels each thereof is attached to a steering axis assembly, said steering axis assembly is directly attached to a lower end of said piston portion of respective hydraulic strut, whereby said piston portion is solely capable of resisting linear horizontal and vertical stresses imparting on the wheel, and whereby any amount of vertical linear movement of said piston portion directly causes a correspondingly equal amount of vertical movement of the vehicle's front section.

17. The combination of claim 16 wherein a front-wheel steering system is provided, further comprises:

a pair of said steering axis assemblies having an outer end and an inner end, fixedly attached to the lower end of the piston portion of respective hydraulic strut, a telescopic link having opposite ends thereof, each of said opposite end is pivotably attached to the respective inner ends of said steering axis assemblies, allowing independent vertical motion of each of said steering axis assemblies with respect to each other, while keeping said steering axis assemblies from rotating with respect to the hydraulic strut on respective side, a pair of spindles for rotatably mounting said pair of front wheel, each of said spindle is horizontally pivotable with the outer end of respective steering axis assembly via an upper and a lower hinge joints, each of said spindle has a spindle arm for receiving steering forces, a pair of wish-bone assemblies each thereof is disposed along side of each of the hydraulic strut on each side, said wish-bone assembly has a lower hub rotatably mounted generally at the level of the lower end of the piston portion of the hydraulic strut and an upper hub rotatably mounted generally at the level of the lower end of the cylindrical portion of the hydraulic strut, said wishbone assembly has an upper V-arm articulated in a vertical direction with a lower V-arm via a pivotable joint, said upper V-arm also articulates vertically with said upper hub and said lower V-arm vertically articulates with said lower hub, a pair of steering input arms fixedly attached to respective upper hubs on each side, said input arms are articulately linked by a tie rod, and at least one of said input arm is further connected to a steering rod for receiving steering input from the cockpit, and, a pair of steering output arms fixedly attached to respective said lower hubs on each side, said output arms are connected to said spindle arms via a pair of steering output rods on respective sides for transmitting steering forces to the front wheels.

18. The steering system of claim 17 further comprises of a steering wheel connected to a steering shaft, said steering shaft has an end attached to a pinion gear, said pinion gear is mated to a steering rack said steering rack is linked to the steering rod for transmitting steering forces from the cockpit occupant to the front wheels.

19. In a roadable flying vehicle of claim 9 designed to operate effectively both in the air and in the roadway, the combination comprising:

a ground-propulsion means for propelling said vehicle while on the road, a cockpit with two-seat side-by-side seating for at least two human occupants, said cockpit is divided into two sides, with one side equipped generally in conventional automobile's arrangement for controlling the vehicle on the road and the other side equipped generally in conventional light aircraft's arrangement for controlling the vehicle while in flight, ground-control means for controlling the vehicle on the ground, comprising of a steering wheel, a speed-selector lever, a brake pedal, and an accelerator pedal, said ground-control means are conventionally grouped as in a typical automobile, generally in front of only one of said two seats, air-control means for controlling the vehicle while flying, comprising of a pitch-and-roll control device, a throttle-control device, and a pair of rudder pedals as yaw control device, said air-control means are grouped conventionally as in a typical light aircraft, generally in front of only a remainder of said two seats, thereby facilitating control of the vehicle by drivers trained in a conventional automobile and by pilots trained in a conventional light aircraft while eliminating accidents due to unfamiliarity with control-device arrangements in an otherwise novel vehicle.

\* \* \* \* \*